United States Patent
McKendrick

(10) Patent No.: US 11,353,342 B2
(45) Date of Patent: Jun. 7, 2022

(54) SHADOW-CAST ENCODER APPARATUS WITH SCALE AND READHEAD PRODUCING A FRINGE PATTERN ON THE DETECTOR WITH A SPECIFIC HARMONIC DISTORTION

(71) Applicant: RENISHAW PLC, Wotton-under-Edge (GB)

(72) Inventor: Alexander David McKendrick, Edinburgh (GB)

(73) Assignee: RENISHAW PLC, Wotton-under-Edge (GB)

( * ) Notice: Subject to any disclaimer, the term of this patent is extended or adjusted under 35 U.S.C. 154(b) by 0 days.

(21) Appl. No.: 16/490,955

(22) PCT Filed: Mar. 6, 2018

(86) PCT No.: PCT/GB2018/050557
§ 371 (c)(1),
(2) Date: Sep. 4, 2019

(87) PCT Pub. No.: WO2018/162886
PCT Pub. Date: Sep. 13, 2018

(65) Prior Publication Data
US 2020/0011712 A1    Jan. 9, 2020

(30) Foreign Application Priority Data
Mar. 7, 2017   (EP) .................................... 17275030

(51) Int. Cl.
*G01D 5/347*     (2006.01)

(52) U.S. Cl.
CPC ..... *G01D 5/34715* (2013.01); *G01D 5/34746* (2013.01)

(58) Field of Classification Search
CPC ... G01D 5/34715; G01D 5/34746; G01D 5/34
See application file for complete search history.

(56) References Cited

U.S. PATENT DOCUMENTS

| 5,889,280 A | 3/1999 | Matsuura |
|---|---|---|
| 8,188,420 B2 | 5/2012 | Lee |

(Continued)

FOREIGN PATENT DOCUMENTS

| CN | 101268330 A | 9/2008 |
|---|---|---|
| CN | 102062614 A | 5/2011 |

(Continued)

OTHER PUBLICATIONS

Apr. 3, 2018 International Search Report issued in International Patent Application No. PCT/GB2018/050557.

(Continued)

*Primary Examiner* — Jennifer D Bennett
(74) *Attorney, Agent, or Firm* — Oliff PLC

(57) ABSTRACT

A shadow-cast encoder apparatus includes a scale and a readhead. The readhead includes at least one electromagnetic radiation source for illuminating the scale in order to produce a shadow-cast fringe pattern at a detector configured to detect the shadow-cast fringe pattern. The encoder apparatus can be configured so as to suppress the total harmonic distortion of the fringe pattern, e.g. such that the total harmonic distortion of the fringe pattern is not more than 6%.

15 Claims, 10 Drawing Sheets

(56) References Cited

U.S. PATENT DOCUMENTS

| | | |
|---|---|---|
| 9,030,194 B2 | 5/2015 | Dolsak |
| 2006/0267822 A1 | 11/2006 | Ito |
| 2007/0024865 A1 | 2/2007 | Mitchell et al. |
| 2007/0102630 A1* | 5/2007 | Igaki .................. G01D 5/38 250/231.16 |
| 2011/0063622 A1* | 3/2011 | Igaki .................. G01D 5/24438 356/498 |
| 2011/0114829 A1 | 5/2011 | Lee |
| 2012/0025812 A1* | 2/2012 | Dolsak ............... G01D 5/24438 324/207.25 |
| 2014/0064565 A1 | 3/2014 | Nagura |
| 2016/0231143 A1 | 8/2016 | Mcadam |

FOREIGN PATENT DOCUMENTS

| | | |
|---|---|---|
| CN | 103033204 A | 4/2013 |
| EP | 2 703 785 A2 | 3/2014 |
| JP | H09-196705 A | 7/1997 |
| JP | 2011-141268 A | 7/2011 |
| JP | 2012-519296 A | 8/2012 |
| JP | 2014-202720 A | 10/2014 |
| JP | 2017111068 A | 6/2017 |
| JP | 6684087 B2 | 4/2020 |

OTHER PUBLICATIONS

Apr. 3, 2018 Written Opinion of the International Searching Authority issued in International Patent Application No. PCT/GB2018/050557.

Jul. 10, 2017 Extended European Search Report issued in European Patent Application No. 17275030.9.

* cited by examiner

SHADOW-CAST ENCODER APPARATUS WITH SCALE AND READHEAD PRODUCING A FRINGE PATTERN ON THE DETECTOR WITH A SPECIFIC HARMONIC DISTORTION

This invention relates to an encoder apparatus, in particular a shadow-cast position measurement encoder apparatus comprising a scale and a readhead which are moveable relative to each other.

As is well known, a position measurement encoder apparatus typically comprises a scale having a series of features which the readhead can read to determine and measure relative position (and its derivatives such as velocity and/or acceleration). Encoders are typically categorised as being either incremental or absolute. A scale for an incremental encoder comprises a series of generally periodic features which the readhead detects to determine a relative position and movement of the scale and readhead. As will be understood, incremental encoders can be configured to provide two signals in quadrature (that are 90 degrees out of phase from each other), and are commonly labelled as SIN and COS signals (even though they may not actually be sine or cosine signals). The quadrature signals can be interpolated to provide an accurate measurement of the position of the readhead to less than one period of the repeating scale pattern. The provision of such quadrature signals by an encoder apparatus is well known in order to provide an indication of direction as well as relative movement of the readhead and scale. One or more reference marks can be provided on the scale to provide reference positions from which the relative position of the scale and readhead can be counted. A scale for an absolute encoder comprises features defining unique positions along the scale length, for instance a series of unique absolute positions, and can enable a readhead to determine its absolute position on start-up without requiring any relative motion.

As will be understood, incremental encoders can work by utilising the diffraction of light to produce at a detector a resultant field which changes with relative motion of the scale and readhead. For instance, light can be diffracted by the scale and a diffraction grating in the readhead so as to form an interference fringe at the detector. It is also known for incremental encoders to operate by the scale features selectively preventing (e.g. blocking) light from reaching the detector such that a non-imaged representation (e.g. shadow) of the scale's features is cast on the incremental detector. Such an encoder is commonly known as a shadow-cast encoder. Shadow-cast encoders can be transmissive (in which the electromagnetic radiation source and detector are on opposing sides of the scale) or reflective (in which the electromagnetic radiation source and detector are on the same side of the scale). In prior art systems, commonly used shapes for the light sources used to illuminate the scale (for both diffractive and shadow-cast encoders) include square and circular shapes.

As is well known in the field of position measurement encoders, sub-divisional error (SDE) can occur due to imperfections in the interpolation of a reading of a signal. Such imperfections can be due to the way in which the reading is processed, and/or due to the signal detected by the readhead being imperfect. It is commonly desired that the signal detected by the readhead is substantially sinusoidal in form (e.g. the variation in intensity of the pattern falling on the detector varies sinusoidally). Deviations from a sinusoidal signal can mean that the signal comprises undesirable frequencies (e.g. harmonics for the signal's first harmonic/fundamental frequency) which adversely affect SDE. In turn, SDE adversely affects the accuracy of the determined position. SDE is also commonly known as "interpolation error". In this document, the terms SDE and interpolation error can be used interchangeably. In the case of an incremental encoder, comprising quadrature signals which can be used to produce a Lissajous, reducing the SDE improves the circularity of the Lissajous.

The present invention provides an improved encoder, in particular an improved shadow-cast encoder.

For example, there is described herein an encoder apparatus comprising a scale and a readhead that is configured to reduce the undesirable frequencies (harmonics) in the scale signal so as to thereby reduce the encoder apparatus' sub-divisional error.

There is described herein an encoder apparatus comprising a scale and a readhead, the readhead comprising at least one electromagnetic radiation source for illuminating the scale in order to produce a fringe pattern at the detector. The fringe pattern could be a non-imaged representation of the scale. In other words, the fringe pattern could be a shadow-cast fringe pattern. The encoder apparatus can be configured so as to suppress the total harmonic distortion of the fringe pattern, e.g. such that the total harmonic distortion of the fringe pattern is not more than 6%.

According to a first aspect of invention there is provided a shadow-cast encoder apparatus comprising a scale and a readhead, the readhead comprising at least one electromagnetic radiation source for illuminating the scale in order to produce a non-imaged representation of the scale/a shadow-cast fringe pattern at a detector configured to detect the shadow-cast fringe pattern. The encoder apparatus can be configured such that the total harmonic distortion (THD) of the non-imaged representation of the scale/shadow-cast fringe pattern is not more than 6%.

It has been found that for a given scale, the configuration of at least one electromagnetic radiation source of the readhead can affect the quality of the non-imaged representation of the scale/shadow-cast fringe pattern. It has been found that the readhead's at least one electromagnetic radiation source can be configured so as to provide an improved non-imaged representation of the scale/shadow-cast fringe pattern, e.g. where the magnitude of undesirable frequencies, such as harmonics, is reduced, for instance to provide a fringe pattern having a THD of not more than 6%. As described in more detail below, this could be achieved, for example by appropriately varying the electromagnetic radiation source's radiant power along an axis substantially parallel with the encoder's measurement dimension and/or by providing a number of electromagnetic radiation sources appropriately offset/spaced apart (e.g. along the encoder's measurement dimension).

The present invention can improve the output of an encoder apparatus, for example by reducing an encoder apparatus' SDE, such as for example SDE caused by imperfections in the signal falling on the readhead's sensor.

Optionally, at least two electromagnetic radiation sources are provided and offset/spaced apart (along the encoder's measurement dimension) such that the total harmonic distortion of the fringe pattern is not more than 6%. Optionally, the radiant power profile of the electromagnetic radiation source can be configured to be non-uniform (along the encoder's measurement dimension) such that the total harmonic distortion of the fringe pattern is not more than 6%.

As will be understood, the THD is a well-known and standardised measurement of the harmonic distortion of a signal, and is calculated using harmonics of the fundamental frequency/first harmonic. In particular, the THD of a signal/fringe pattern can be defined as the ratio of the sum of powers of all (measureable) harmonic components to the power of the first harmonic. In this case, the THD can be determined taking into consideration harmonics up to and including the thirteenth harmonic.

Optionally the total harmonic distortion of the fringe pattern is not more than 3%, optionally not more than 2%, optionally not more than 1.5%, optionally not more than 1%, optionally not more than 0.7%.

Optionally the magnitude of the third harmonic of the fringe pattern is not more than 3% of the magnitude of the first harmonic, optionally not more than 2%, optionally not more than 1%.

Optionally the magnitude of the fifth harmonic of the fringe pattern is not more than 3% of the magnitude of the first harmonic, optionally not more than 2%, optionally not more than 1%.

The shadow-cast encoder may comprise a plurality of (e.g. at least one group of a plurality of) electromagnetic radiation sources for illuminating the scale in order to produce the fringe pattern.

Optionally the electromagnetic radiation sources are spaced apart so as to be in positions equivalent to being offset/spaced apart by a distance substantially equal to the period of a (particular) harmonic of the first harmonic divided by the number of electromagnetic radiation sources.

For example, the electromagnetic radiation sources can be offset/spaced apart, in the apparatus' measuring direction by a distance D wherein $$D \approx M\left(n_i f \pm \frac{f}{hs}\right)$$

where
f is the pitch of the scale;
h is the order of the (particular) harmonic to be cancelled;
s is the number of sources;
$n_i$ is an integer (which as will be understood an integer includes zero);
M is the magnification of the encoder.

Such an arrangement can substantially reduce/suppress, and even substantially eliminate the (particular) harmonic.

$$\text{Optionally } D = M\left(n_i f \pm \frac{f}{hs}\right)$$

The (particular) harmonic of the first harmonic can be an odd-numbered harmonic. The (particular) harmonic of the first harmonic can be the third, fifth and/or seventh harmonic.

As will be understood, where there are more than two sources, it might be necessary to determine multiple values of D, e.g. D' and D", and therefore, $n_i$ may be the same or different for each separation. For example, in the case of there being three sources (and therefore two offsets/separations):

$$D' \approx M\left(1f \pm \frac{f}{hs}\right)$$

-continued
$$D'' \approx M\left(2f \pm \frac{f}{hs}\right)$$

The at least two sources can also be offset/spaced apart in a direction transverse to the apparatus' measurement direction. In particular, this may be useful when $n_i=0$.

As explained in more detail below, it is possible to separate sources (e.g. a group of sources) by a particular distance (F) such that they effectively behave as if they were a single source (e.g. they effectively form/provide a single source). In that case the form of the fringe pattern can remain unchanged (and so the ratio of the magnitudes of the harmonic can remain unchanged). Optionally:

$$F=fM$$

Where f is the pitch of the scale and M is the magnification of the encoder.

Optionally $$M = \frac{u+v}{v}$$

where
u is the distance from the source to the scale;
v is the distance from the scale to the detector.

Optionally the electromagnetic radiation sources are offset/spaced apart such that at the detector the (particular) harmonic of the first harmonic of their respective (shadow-cast) fringe patterns substantially cancel-out. In other words, optionally the electromagnetic radiation sources are offset/spaced apart such that the (particular) harmonic content of the fringe pattern cancels at the detector. Optionally the electromagnetic radiation sources are offset/spaced apart such that the lateral shift between their respective (shadow-cast) fringe patterns is equal/equivalent to the period of the (particular) harmonic of the first harmonic, divided by the number of electromagnetic radiation sources.

Optionally the at least one electromagnetic radiation (EMR) source comprises a single EMR source. Optionally the at least one EMR source comprises more than one EMR source. Optionally the at least one EMR source comprises two EMR sources. Optionally the at least one EMR source comprises three EMR sources. As will be understood (and as will be explained in more detail below) any one EMR source could be an effective single source, which comprises a plurality of sub-sources. In other words, optionally the or each at least one EMR source is formed from more than one sub-source. Optionally the or each at least one EMR sources are distributed between two or more equivalent positions. Optionally the or each at least one EMR sources are distributed between two or more equivalent positions such that at the detector a (particular) harmonic of the first harmonic of their respective (shadow-cast) fringe patterns substantially cancel-out. Optionally the or each at least one EMR sources are distributed between two or more equivalent positions such that the lateral shift between their fringe patterns is equal to the period of a harmonic of the first harmonic divided by the number of EMR sources. Optionally the or each at least one EMR sources are distributed between two or more equivalent positions such that their fringe pattern is equivalent to a unitary EMR source.

Optionally at least one group of a plurality of electromagnetic radiation sources comprises two electromagnetic radiation sources. Optionally at least one group of a plurality of electromagnetic radiation sources comprises three electromagnetic radiation sources. Optionally at least one group of a plurality of electromagnetic radiation sources comprises one effective electromagnetic radiation source. Optionally the at least one group of a plurality of electromagnetic radiation sources comprises two groups of a plurality of electromagnetic radiation sources. Optionally the at least one group of a plurality of electromagnetic radiation sources comprises three groups of a plurality of electromagnetic radiation sources.

Optionally a first electromagnetic radiation source or first group of electromagnetic radiation sources and a second electromagnetic radiation source or second group of electromagnetic radiation sources are provided. Each of the first electromagnetic radiation source or first group of electromagnetic radiation sources and second electromagnetic radiation source or second group of electromagnetic radiation sources can substantially comprise corresponding parts to the other of the first electromagnetic radiation source or first group of electromagnetic radiation sources and second electromagnetic radiation source or second group of electromagnetic radiation sources. The corresponding parts of the first electromagnetic radiation source or first group of electromagnetic radiation sources and second electromagnetic radiation source or second group of electromagnetic radiation sources can be spaced apart by a distance D.

Optionally a third electromagnetic radiation source or third group of electromagnetic radiation sources is provided. Optionally the third electromagnetic radiation source or third group of electromagnetic radiation sources substantially comprises part to the first electromagnetic radiation source or first group of electromagnetic radiation sources and/or second electromagnetic radiation source or second group of electromagnetic radiation sources. Optionally corresponding parts of the first electromagnetic radiation source or first group of electromagnetic radiation sources, the second electromagnetic radiation source or second group of electromagnetic radiation sources and the third electromagnetic radiation source or third group of electromagnetic radiation sources is provided are spaced apart by a distance D.

Optionally the (particular) harmonic of the first harmonic is the third harmonic. Optionally two electromagnetic radiation sources are spaced apart by a distance equivalent to half the period of the third harmonic. Optionally three electromagnetic radiation sources are spaced apart by a distance equivalent to a third of the period of the third harmonic. Optionally the (particular) harmonic of the first harmonic is the fifth harmonic. Optionally two electromagnetic radiation sources as spaced apart by a distance equivalent to half the period of the fifth harmonic. Optionally three electromagnetic radiation sources are spaced apart by a distance equivalent to a third of the period of the fifth harmonic.

Optionally the at least one EMR source is configured such that its radiant power along its extent parallel to the apparatus measurement direction is configured to vary such that said total harmonic distortion of the fringe pattern is achieved. Optionally the at least one EMR source produces a radiant power profile which is triangular. Optionally, the total radiant power of a middle third of the at least one EMR source is greater than the total radiant power of each of the outer two thirds of the at least one EMR source (e.g. such that the peak of the radiant power is toward the middle of the at least one EMR source). Optionally the at least one EMR source produces a radiant power profile which produces a fringe pattern at the detector which has substantially no harmonic content. Optionally the at least one EMR source produces a radiant power profile for producing a fringe pattern at the detector which has a total harmonic distortion of substantially zero.

Optionally the at least one EMR source is shaped such that its width varies along its extent so as to produce said variation in radiant power. Optionally, the at least one EMR source is shaped such that its radiant power profile along its extent parallel to the apparatus measurement direction is not substantially uniform/constant. Optionally the EMR source is not square in shape (and arranged such that its sides are parallel to the apparatus' measuring dimension). Optionally the EMR source is not circular in shape. Optionally, the at least one EMR source is shaped such that its radiant power profile along its extent parallel to the apparatus measurement direction is not that of a semi-ellipse (e.g. not that of a semi-ellipse where the ellipse' minor axis extends along the apparatus' measuring dimension). Optionally the at least one EMR source is shaped such that its radiant power profile along its extent parallel to the apparatus measurement direction is not that of a semi-ellipse wherein the major axis is twice the minor axis.

Optionally, the at least one EMR source comprises a light source. As will be understood, in this document light includes EMR anywhere in the infra-red to ultraviolet range of the EMR spectrum.

Optionally, the detector comprises at least one sensor element, and for example an array of sensor elements. Optionally, the array extends along (e.g. parallel to) apparatus' measurement dimension. Optionally, the detector comprises sensor elements configured to detect different phases of the shadow-cast fringe pattern. Optionally, each sensor element comprises a selector arrangement (placed on or in front of the sensor element), such as a grating or mask, for selecting the phase of the fringe pattern that a sensor element detects. Accordingly, the detector can comprise one or more sensor elements, and optionally other (e.g. optical) components, such as said grating/mask. Optionally, the detector comprises an electrograting which comprises a sensor array comprising two or more sets of interdigitated/interleaved sensor elements, each set being configured to detect a different phase of the interference fringe. Each set could be referred to as a channel.

As will be understood, the scale can comprise a generally periodic array of features. The scale can comprise a periodic arrangement of two (e.g. distinct) types of feature. The periodic pattern of features can provide alternating degrees of restriction of the EMR from the EMR source to the (e.g. that is propagated toward the) detector (so as to form said fringe pattern). Accordingly, when the scale comprises a periodic arrangement of two types of feature one can (e.g. uniformly) provide a first level of restriction, and the other can (e.g. uniformly) a second level of restriction. One of the levels of restriction can be substantially zero (e.g. so as to substantially not restrict the EMR from the source from travelling toward the detector). For example, the periodic pattern of features can alternately restrict (e.g. prevent) and facilitate electromagnetic radiation from being propagated toward the detector (so as to form said fringe pattern). For example, the periodic pattern of features can alternately block and transmit electromagnetic radiation, or for example alternately absorb (or scatter) and reflect electromagnetic radiation. The array can extend along (e.g. parallel to) the encoder's measurement dimension. The features can comprise substantially elongate features, the length of which extend substantially perpendicular to the measuring dimension. The features can be discrete/distinct features. For example, taken along the apparatus' measuring dimension, each of the (e.g. two types of) scale features can provide a uniform/constant degree of restriction of the EMR from the EMR source that is propagated toward the detector.

Optionally the scale period is at least 40 μm, for example at least 60 μm, for instance at least 80 μm.

Optionally the encoder is an incremental encoder. Optionally the encoder is a reflective encoder. Optionally the encoder is a transmissive encoder. Optionally the scale comprises reference marks. Optionally the reference marks are reflective or allow transmission of electromagnetic radiation. Optionally the part of the scale in which the reference marks are located absorbs electromagnetic radiation. Optionally the reference marks absorb electromagnetic radiation. Optionally the part of the scale in which the reference marks are located reflects or transmits electromagnetic radiation. Optionally the scale is a reflective scale. Optionally the scale is a transmissive scale.

Optionally the subdivision error (SDE) of the encoder apparatus is less than 0.15 μm, optionally less than 0.1 μm.

Optionally fringe pattern is formed from electromagnetic radiation from more than one spaced apart electromagnetic radiation sources. Optionally the fringe pattern is formed at the detector.

As will be understood, variations and options of the above described aspect of the invention are equally applicable to the below aspects of the invention and vice versa.

According to another aspect of invention there is provided a shadow-cast encoder apparatus comprising a scale and a readhead, the readhead comprising at least one electromagnetic radiation source for illuminating the scale in order to produce a shadow-cast fringe pattern at a detector configured to detect the shadow-cast fringe pattern; wherein the at least one electromagnetic radiation source is configured such that the total harmonic distortion of the shadow-cast fringe pattern is not more than 6%.

According to a further aspect of invention there is provided a shadow-cast encoder apparatus comprising a scale and a readhead, the readhead comprising at least one electromagnetic radiation source for illuminating the scale in order to produce a shadow-cast fringe pattern at a detector configured to detect the shadow-cast fringe pattern;

wherein the at least one electromagnetic radiation source is configured such that the magnitude of the third harmonic of the shadow-cast fringe pattern is not more than 3% of the magnitude of the fundamental/first harmonic and/or configured such that the magnitude of the fifth harmonic of the shadow-cast fringe pattern is not more than 3% of the magnitude of the fundamental/first harmonic.

According to a yet further aspect of invention there is provided a shadow-cast encoder apparatus comprising a scale and a readhead, the readhead comprising (e.g. at least one group of) a plurality of electromagnetic radiation sources for illuminating the scale in order to produce a shadow-cast fringe pattern and a detector for detecting the shadow-cast fringe pattern; wherein the electromagnetic radiation sources are spaced apart in the apparatus measuring direction by a distance D wherein $$D \approx M\left(n_i f \pm \frac{f}{hs}\right)$$

where
  f is the pitch of the scale;
  h is the order of the harmonic to be cancelled;
  s is the number of sources;
  $n_i$ is an integer (which may be the same or different for each separation);
  M is the magnification of the encoder.

According to a further aspect of invention there is provided an encoder apparatus comprising a scale and a readhead, the readhead comprising at least one electromagnetic radiation (EMR) source for illuminating the scale which comprises a generally periodic array of features which provide alternating degrees of restriction of the EMR from the EMR source to the detector in order to produce a fringe pattern at a detector configured to detect the fringe pattern; wherein the total harmonic distortion (THD) of the fringe pattern is not more than 6%. Optionally the scale period is at least 40 μm, for example at least 60 μm, for instance at least 80 μm. The scale can comprise a periodic arrangement of two (e.g. distinct) types of feature. Accordingly, when the scale comprises a periodic arrangement of two types of feature one can (e.g. uniformly) provide a first level of restriction, and the other can (e.g. uniformly) a second level of restriction. One of the levels of restriction can be substantially zero (e.g. so as to substantially not restrict the EMR from the source from travelling toward the detector). For example, the periodic pattern of features can alternately restrict (e.g. prevent) and facilitate electromagnetic radiation from being propagated toward the detector (so as to form said fringe pattern). For example, the periodic pattern of features can alternately block and transmit electromagnetic radiation, or for example alternately absorb (or scatter) and reflect electromagnetic radiation. The array can extend along (e.g. parallel to) the encoder's measurement dimension. The features can comprise substantially elongate features, the length of which extend substantially perpendicular to the measuring dimension. The features can be discrete/distinct features. For example, taken along the apparatus' measuring dimension, each of the (e.g. two types of) scale features can provide a uniform/constant degree of restriction of the EMR from the EMR source that is propagated toward the detector.

According to a further aspect of the invention there is provided an encoder apparatus comprising a scale and a readhead, the readhead comprising a plurality of electromagnetic radiation (EMR) sources for illuminating the scale in order to produce a (shadow-cast) fringe pattern at a detector configured to detect the fringe pattern; wherein the electromagnetic radiation sources are offset/spaced apart such that at the detector a (particular) harmonic of the first harmonic of their respective (shadow-cast) fringe patterns substantially cancel-out. The (particular) harmonic of the first harmonic can be an odd-numbered harmonic. The (particular) harmonic of the first harmonic can be the third, fifth and/or seventh harmonic.

Embodiments of the invention will now be described, by way of example only, with reference to the following drawings, in which:

FIG. 1 is a schematic diagram illustrating an encoder apparatus according to the present invention;

FIG. 2 schematically illustrates the optical scheme of the encoder apparatus of FIG. 1;

FIG. 5(a) is a schematic ray diagram illustrating the generation of a fringe at an incremental photodetector produced by an EMR source comprising a number of EMR point sources having infinitely small spacing there between;

FIG. 5(b) shows a trapezoidal fringe pattern generated by the EMR source of FIG. 5(a);

FIG. 5(c) shows the harmonic content of the trapezoidal fringe pattern of FIG. 5(b);

Figure 10:
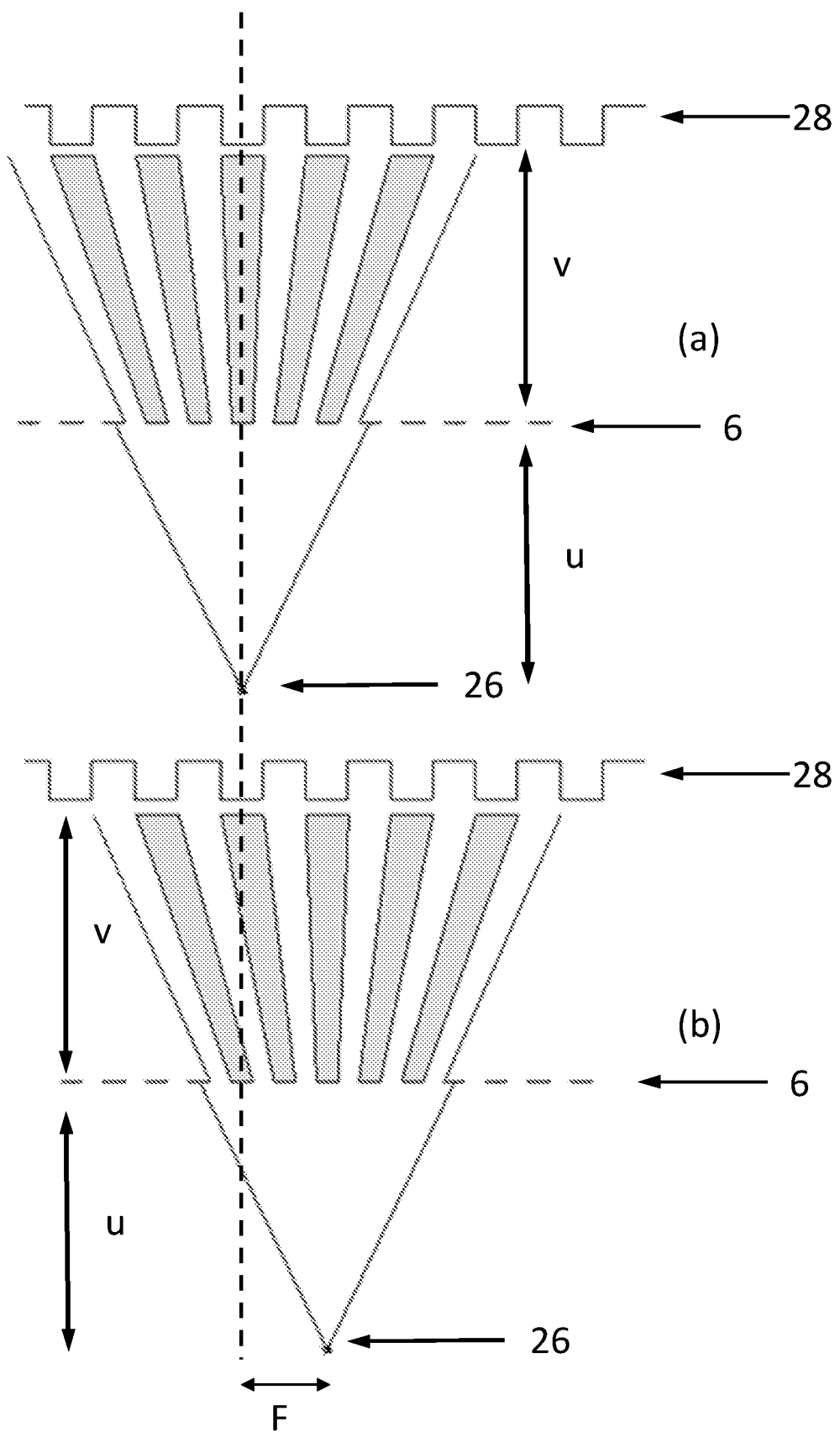
Figure 11:
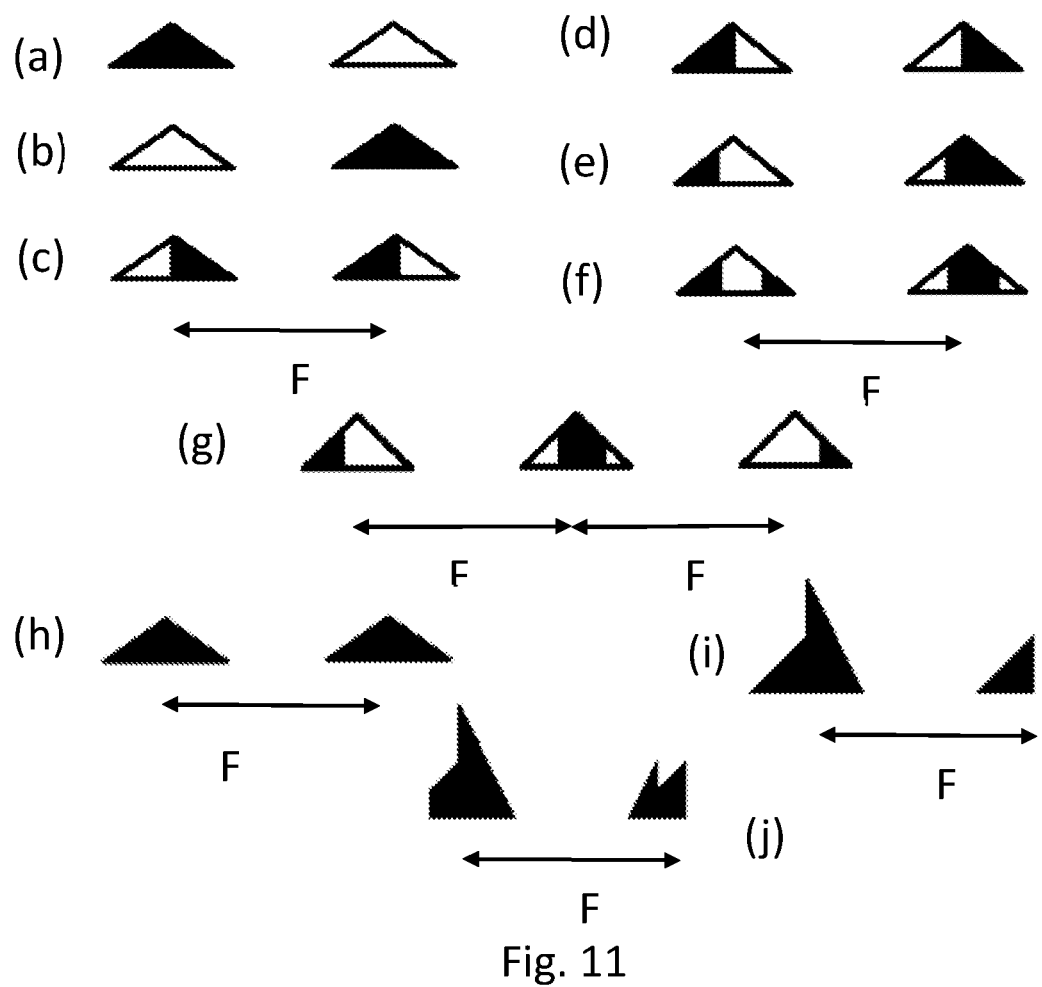
Figure 12:
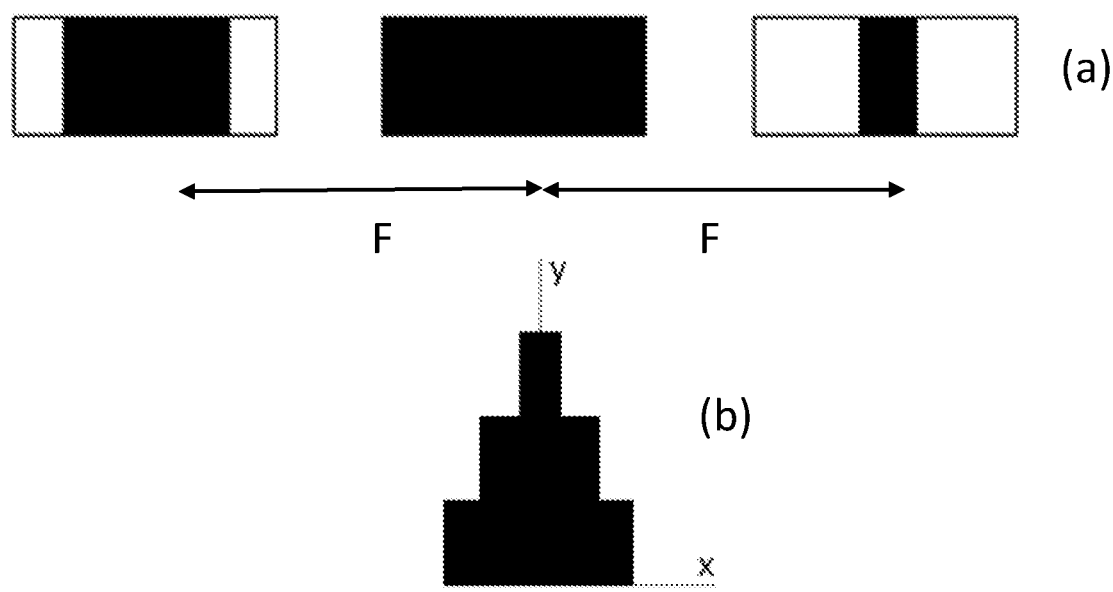

FIG. 10 schematically shows equivalent two positions of a point source relative to a scale;

FIG. 11 schematically shows equivalent distributions of a shaped EMR source;

FIG. 12 schematically shows an alternative arrangement for varying the radiant power distribution at the detector in order to reduce undesired harmonics.

Figure 13:
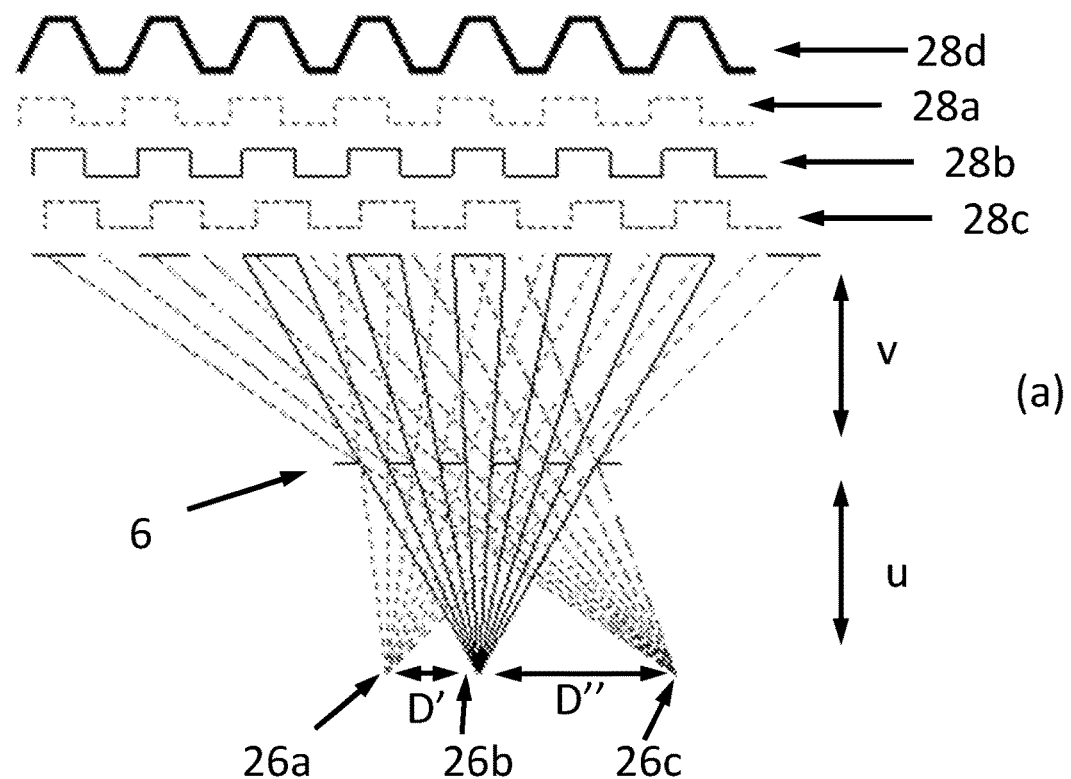
Figure 13:
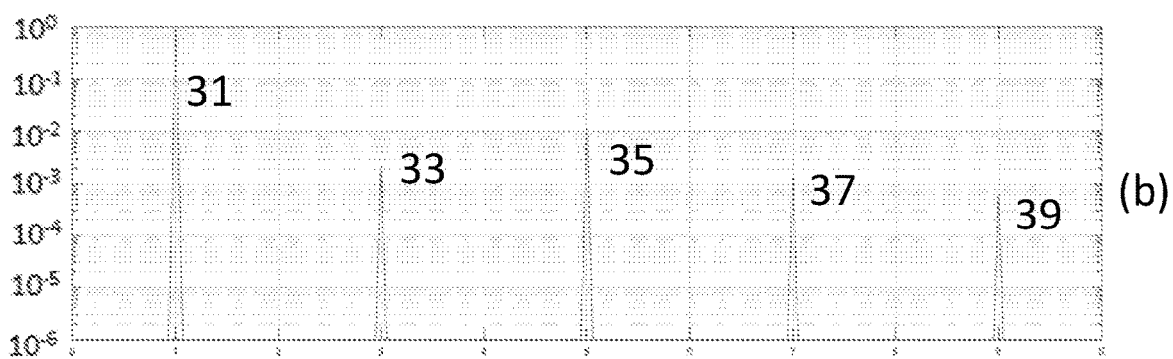
Figure 13:
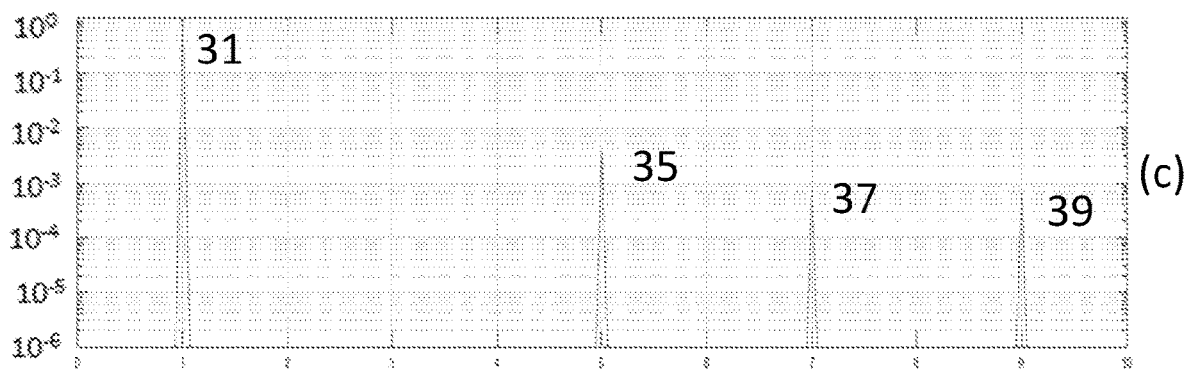
Figure 14:
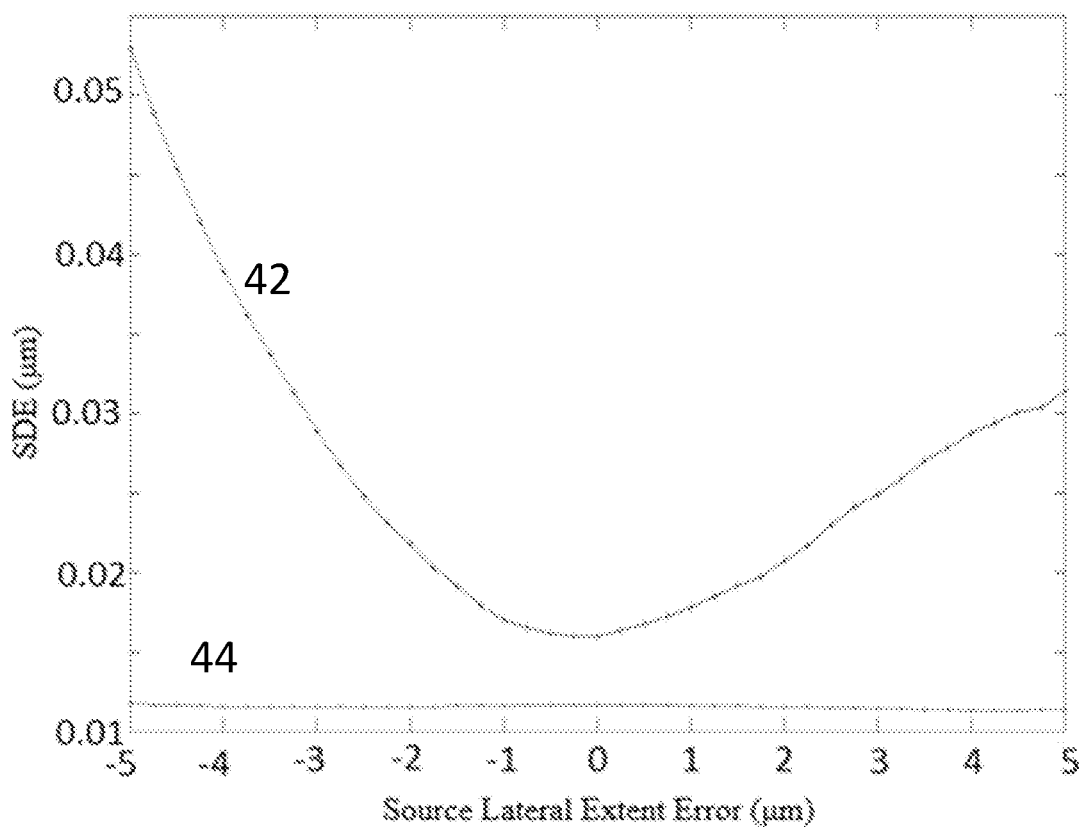
Figure 15:
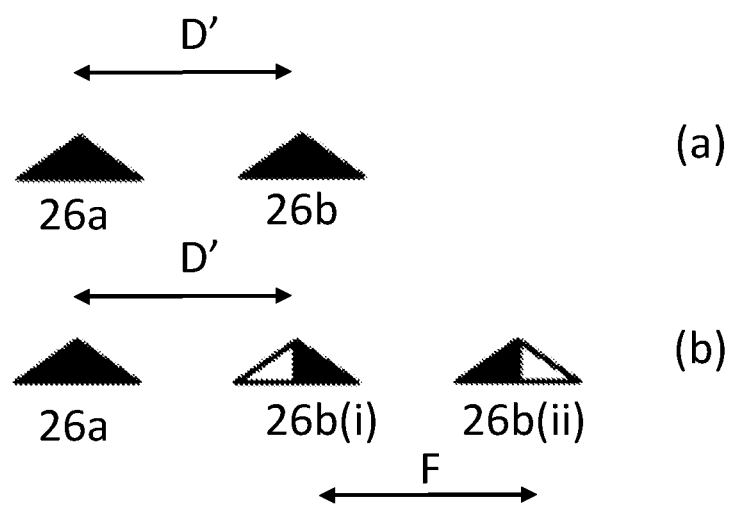

FIG. 13(a) is a schematic ray diagram illustrating the generation of a fringe at an incremental produced by a number of spaced apart point sources;

FIG. 13(b) shows harmonic content of a single triangular EMR source;

FIG. 13(c) shows the harmonic content of three spaced apart triangular EMR sources;

FIG. 14 shows variance in SDE with source lateral extent error for a single triangular EMR source and three separated triangle EMR sources; and FIG. 15 schematically shows arrangements of EMR sources spaced apart to cancel the third harmonic.

Figure 1:
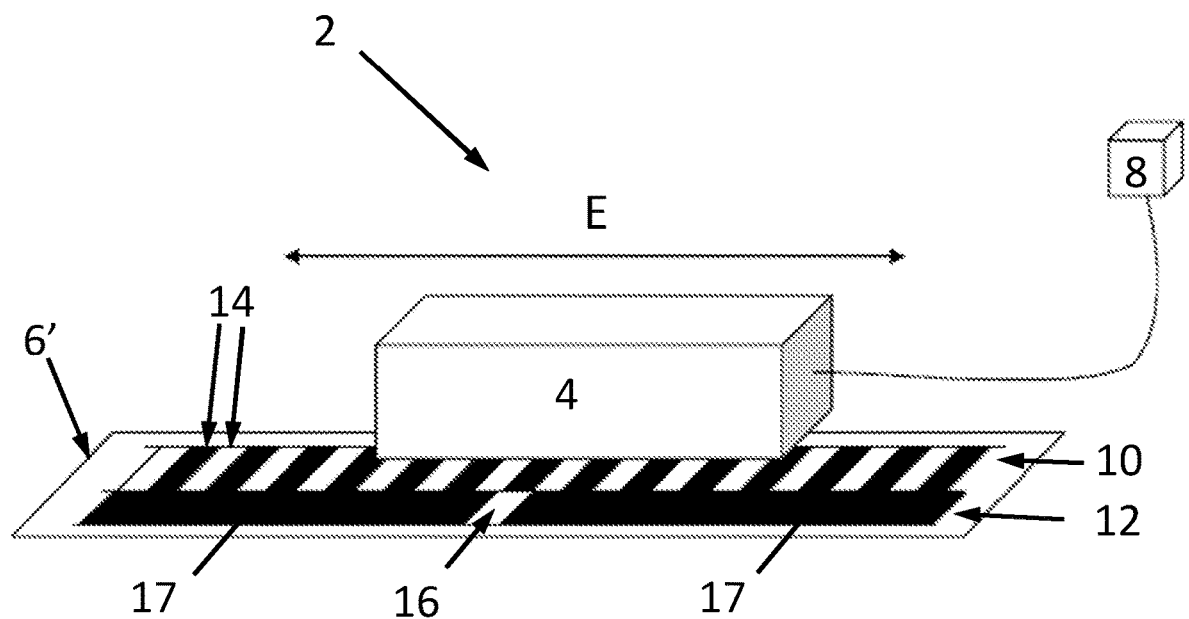
Figure 2:
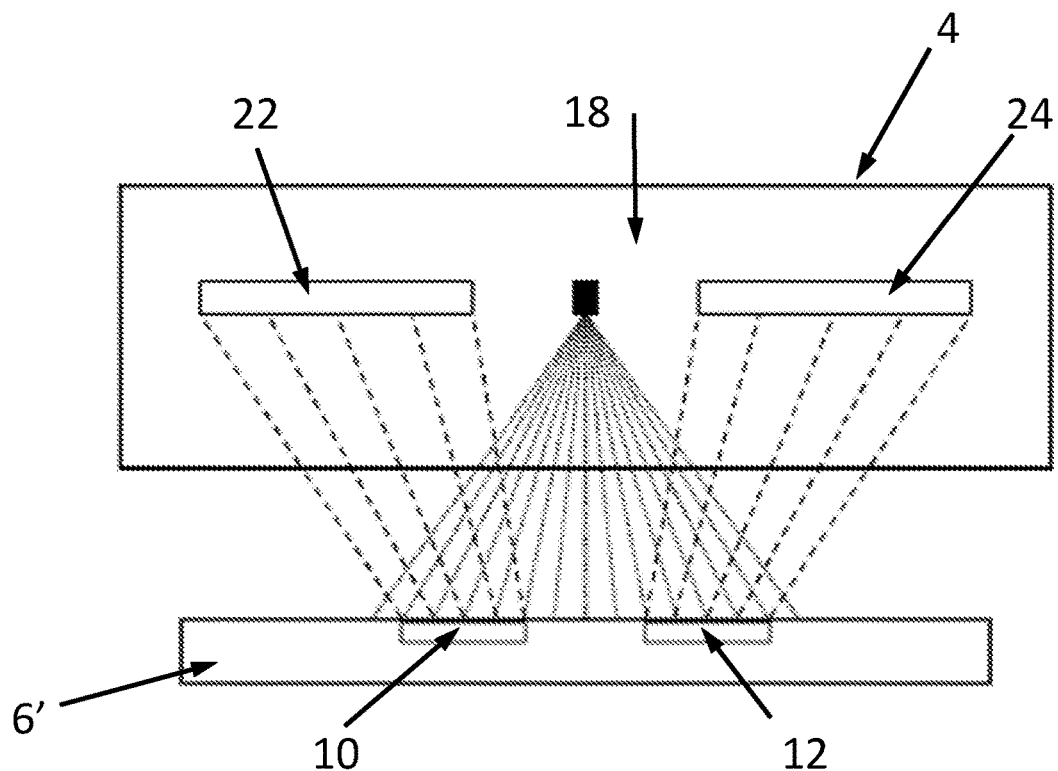

With reference to FIGS. 1 and 2 there is shown a first example encoder apparatus 2 according to the present invention. The encoder apparatus comprises a readhead 4 and a scale 6'. Although not shown, in use the readhead 4 can be fastened to one part of a machine and the scale 6' to another part of the machine which are movable relative to each other. The readhead 4 is used to measure the relative position of itself and the scale 6' and hence can be used to provide a measure of the relative position of the two movable parts of the machine. The readhead 4 communicates with a processor such as a controller 8 via a wired (as shown) and/or wireless communication channel. As will be understood, processors can include bespoke processors configured for the specific application (e.g. a field programmable gate array "FPGA") as well as more generic processors which can be programmed (e.g. via software) in accordance with the needs of the application in which it is used. The readhead 4 can report the signals from its detectors to the controller 8 which then processes them to determine position information and/or the readhead 4 can itself process the signals from its detectors and send position information to the controller 8. In another embodiment, an intermediate unit, e.g. an interface unit, can be located between the readhead 4 and the controller 8. The interface unit can facilitate communication between the readhead 4 and controller 8. For example, the interface unit could be configured to process readhead signals and provide position information to the controller 8.

The scale 6' comprises a plurality of scale markings defining an incremental track 10. In the embodiment described, the scale 6' also comprises a reference track 12.

In this embodiment, the encoder apparatus is an optical, shadow cast encoder. Accordingly, the incremental track 10 comprises a series of periodic scale marks 14 which form a scale grating extending in an elongate scale direction which runs substantially parallel to the movement direction of readhead 4 as shown by arrow E in FIG. 1. In the illustrated embodiment the periodic scale marks 14 are alternating relatively reflective and relatively absorbent marks. When the pitch of the scale grating is sufficiently large (typically greater than 40 μm), geometric shadow casting is the dominant mechanism for forming a fringe pattern on a detector array and the small amount of diffraction can be neglected.

The reference track 12 comprises a reference position defined by a reflective reference mark 16. The rest of the track comprises features 17 which absorb light. It will be understood that in other embodiments, reference mark 16 may absorb light and features 17 may reflect light. Accordingly, the reference position is defined by a mark which permits relatively more light to reach the reference photodetector 24 than the rest of the track in which it is contained, and in this case is relatively more reflective than the rest of the track in which it is contained. Reference positions can be useful to enable the readhead 4 to be able to determine exactly where it is relative to the scale 6'. Accordingly, the incremental position can be counted from the reference position. Furthermore, such reference positions can be what are also referred to as "limit positions" in that they can be used to define the limits or ends of the scale 6' between which the readhead 4 is permitted to travel.

In this embodiment, the encoder apparatus is a reflective optical encoder in that it comprises an electromagnetic radiation (EMR) source 18, e.g. an infra-red light source 18, and at least one detector 22, 24 on the same side of the scale 6'. However, this need not be the case and the encoder could be configured such that the EMR source 18 and the at least one detector could be on opposite sides of the scale 6'. In general, infra-red light from the light source 18 is configured to be reflected by the scale 6' back toward the readhead. As illustrated, the light source 18 is divergent and the light source's illumination footprint falls on both the incremental track 10 and the reference track 12. In the embodiment described, the light source 18 emits EMR in the infra-red range, however as will be understood, this need not necessarily be the case and could emit EMR in other ranges, for example anywhere in the infra-red to the ultra-violet. As will be understood, the choice of a suitable wavelength for the light source 18 can depend on many factors, including the availability of suitable detectors that work at the electromagnetic radiation (EMR) wavelength. As also illustrated, the readhead 4 also comprises an incremental photodetector 22 and a reference photodetector 24. The incremental photodetector 22 in the illustrated embodiment comprises a detector array in the form of an electrograting.

Figure 3:
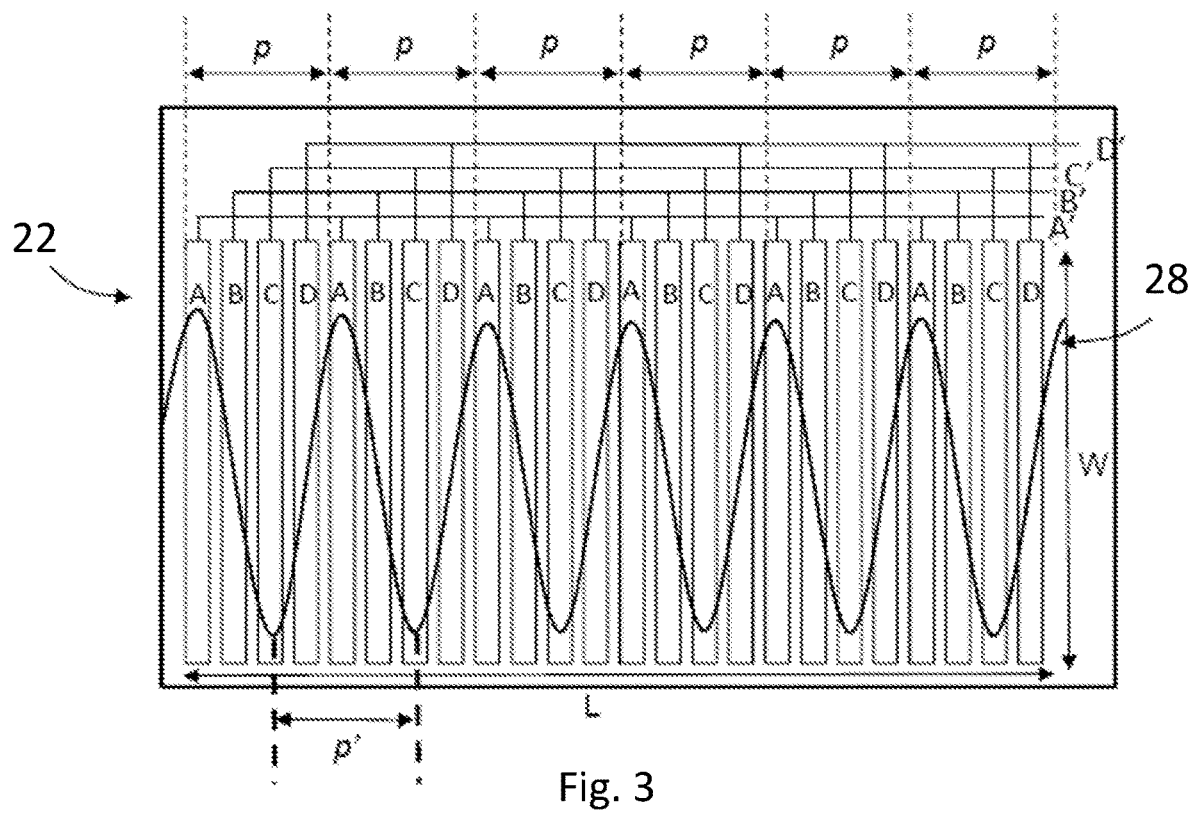
FIG. 3 is a schematic representation of an electrograting.

The incremental detector 22 may be in the form of an electrograting which is shown in more detail in FIG. 3. As shown the incremental detector 22 comprises a photo-sensor array which comprises two or more sets of interdigitated/interlaced/interleaved photo-sensitive sensor elements (also referred to herein as "photodetectors" or "fingers"). Each set can, for example, detect a different phase of the shadow-cast fringe pattern 28 at the detector 22. FIG. 3 shows the fingers/photodiodes of four sets of photodiodes (A, B, C and D) interdigitated/interleaved to form an array of sensor elements extending along the length "L" of the sensor. The sets of photodiodes are arranged in a repeating arrangement, having a period "p" (and hence a frequency "f" being 1/"p").

As shown, in the embodiment described, the individual fingers/photodiodes/sensor elements extend substantially perpendicular to the length L of the incremental detector 22. Also, the individual fingers/photodiodes/sensor elements are substantially rectangular in shape. As will be understood, the invention is also applicable to other shaped and arranged sensor elements.

The output from each finger/photodiode in a set is combined to provide a single output, thereby resulting in four channel outputs: A', B', C' and D'. These outputs are then used to obtain the quadrature signals SIN and COS. In particular, A'-C' is used to provide a first signal (SIN) and B'-D' is used to provide a second signal (COS) which is 90 degrees out of phase from the first signal. Although in the specific embodiment the electrograting comprises four sets of photodiodes providing four the channels A', B', C' and D', this need not necessarily be the case. For example, the electrograting could comprise two sets of photodiodes providing just two channels A' and B'.

In FIG. 3, the shadow-cast fringe pattern 28 is represented by a line which schematically illustrates the varying radiant power of an ideal shadow-cast fringe pattern (i.e. caused by the shadow of the incremental scale track 10) across the incremental detector 22. As illustrated, the encoder apparatus is configured such that at any one instant in time all the photodiodes in any one set detect the same phase of the shadow-cast fringe (if the shadow-cast fringe pattern period p', and sensor period p are the same).

As shown in FIG. 2, the light source 18 is positioned between the incremental photodetector 22 and the reference photodetector 24, in a direction substantially transverse to an elongate scale direction. This facilitates even illumination of both the incremental track 10 and reference mark track 12.

Light from the light source 18 is emitted from the readhead 4 toward the scale 6', where part of the light source's 18 footprint interacts with the reference mark track 12 and part of the light source's footprint interacts with the incremental track 10. In the currently described embodiment, the reference position is defined by a feature 16 in the reference mark track 12 which modifies the amount of light from the light source 18 that is reflected back toward the reference photodetector 24 compared to the rest of the track in which the reference mark is contained. This could be achieved, for example, by the features 17 in the rest of the reference mark track 12 absorbing, transmitting and/or scattering more light than the reference mark 16. In the position illustrated in FIG. 2, the readhead 4 is aligned with the reference position and so the light is shown as being reflected back toward the reference photodetector 24.

With respect to the incremental track 10, light from the source 18 falls on the periodic scale marks 14. As the readhead 4 moves relative to the scale 6' (in the direction shown by arrow E) some of the light is absorbed, transmitted and/or scattered by the scale markings 14 and some of the light is reflected back toward the readhead 4 and onto incremental photodetector 22. Ideally the output from the incremental photodetector 22 which comprises an electrograting as described above varies sinusoidally with relative motion (i.e. is spatially sinusoidal).

It will be appreciated that while the current embodiment has been described in connection with an electrograting, other embodiments may use different devices and/or methods for monitoring position of the readhead 4. For example, the incremental photodetector 22 may comprise one or more photodiodes with a respective (e.g. chrome) masks to allow detection of phase information.

Figure 4:
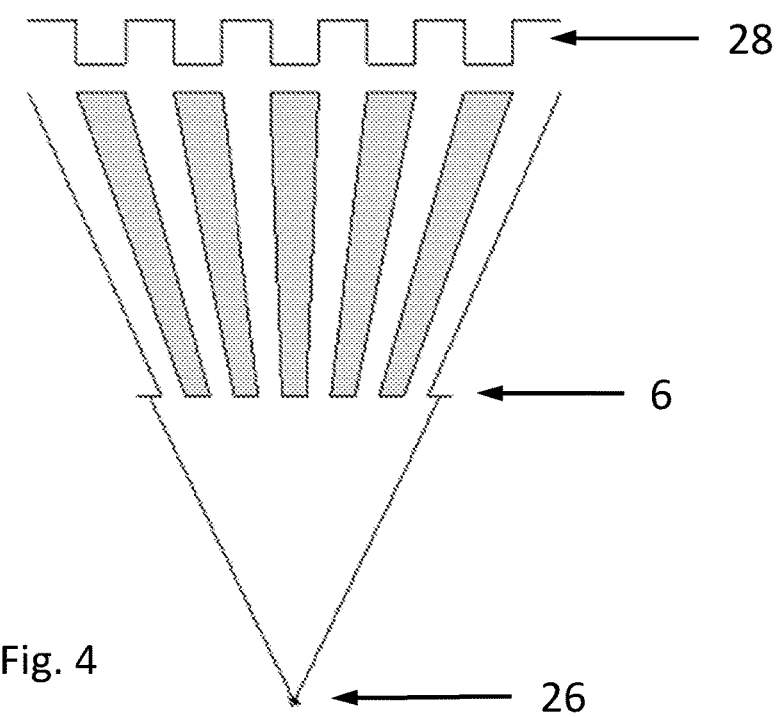
FIG. 4 is a schematic ray diagram illustrating the generation of a fringe at an incremental photodetector by a point source.

FIG. 4 schematically shows light from a point source 26 interacting with a scale 6 and producing a shadow cast fringe pattern 28 at the incremental photodetector 22. For the sake of clarity FIG. 4 shows a transmissive arrangement where light from point source 26 passes through scale 6' rather than being reflected by the scale 6', it will be understood that both reflective and transmissive arrangements are possible.

As can be seen in FIG. 4, EMR (in this embodiment infra-red light, in other embodiments the EMR may be any wavelength in the ultra violet to infra-red spectrum) from point source 26 is directed towards scale 6. The scale 6 allows the passage/propagation of light in some regions along the scale but prevents such passage/propagation in other regions. In FIG. 4, shaded areas represent areas where the passage/propagation of light has been blocked by the scale 6. Due to the pitch of the scale 6 (which in this embodiment is approximately 80 μm, but can typically be anything greater than 40 μm) geometric shadow casting is the dominant mechanism for forming a fringe pattern on incremental photo detector 22 and a square wave fringe pattern 28 is detected. The minimum scale pitch is determined by the extent diffraction reduced the visibility of the fringes below an acceptable level. Using the Rayleigh criterion for visibility, the lower limit for the scale pitch (f) is given by equation (1)

$$f=\sqrt{2\lambda u} \tag{1}$$

where

λ is the EMR wavelength;

u is the distance from the EMR source to the scale.

The incremental photodetector 22 (not shown in FIG. 4) detects the fringe pattern 28 to produce a signal (as described above in connection with FIGS. 1 to 3) which is output by the readhead 4 to an external device such as controller 8. It will be appreciated that the output from the incremental photodetector 22 for a square wave shadow-cast fringe pattern 28 produced by a single point source deviates substantially from the ideal pure sinusoidal signal. Deviation of the detected shadow-cast fringe pattern 28 from the ideal sinusoidal shadow-cast fringe pattern causes the outputs of the incremental photodetector 22 to deviate from being purely sinusoidal which leads to SDE.

Figure 5:
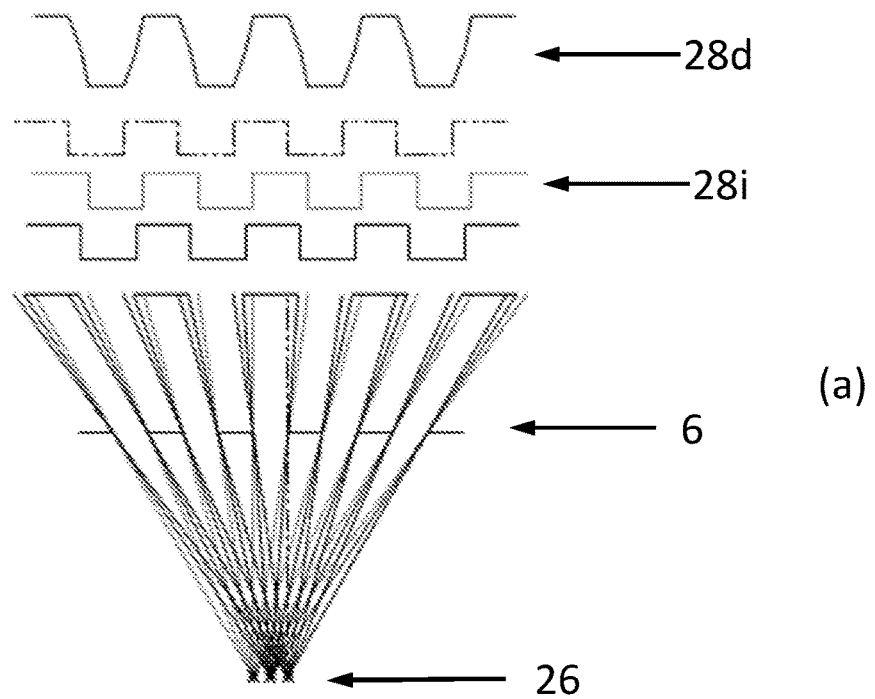
Figure 5:
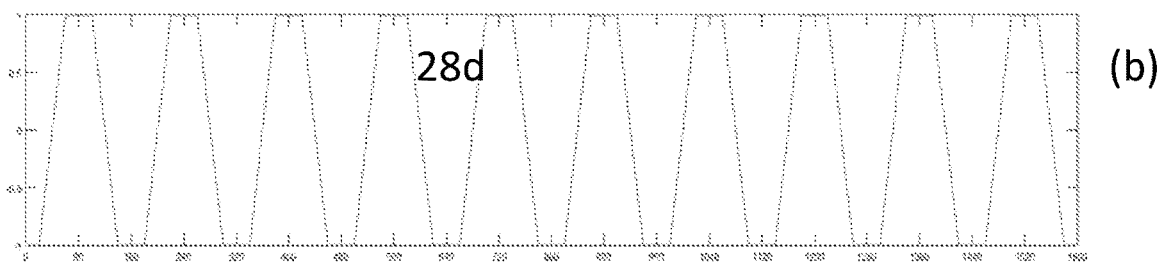
Figure 5:
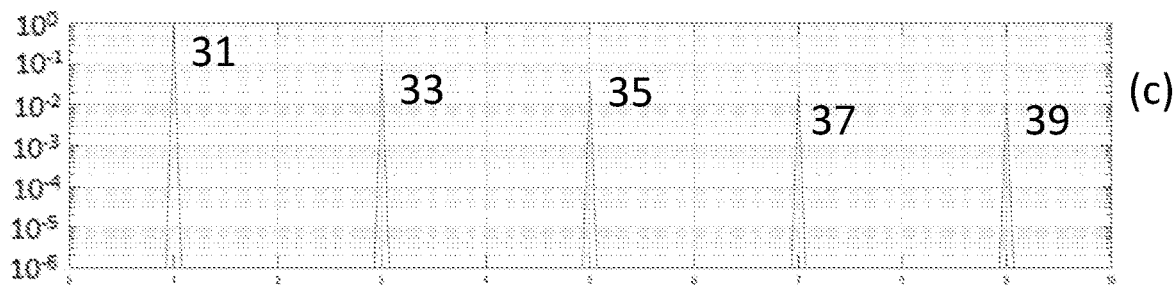

In practical applications the EMR source is not a point source such as point source 26 shown in FIG. 4 but will have a finite extent. Here the extent referred to is the extent of the EMR source substantially parallel to the elongate scale direction. An EMR source having a finite extent can be thought of as an infinite number of point sources 26 having an infinitely small separation. FIG. 5(a) shows such an EMR source having a finite extent and shows only three point sources 26 for clarity. Light from each point source 26 is directed towards scale 6 which allows the passage of light in some regions along the scale but prevents such passage in other regions. Each point source will produce an individual square wave fringe pattern 28i which are offset from each other and which produce a combined fringe pattern 28d which is detected by incremental photodetector 22. As can be seen the combined fringe pattern 28d is trapezoidal. It will be appreciated that the shape of the combined fringe pattern 28d will vary depending on the extent of the EMR source and, for instance could be triangular. These patterns have considerable higher harmonic (i.e. multiples of the fundamental) content compared to the ideal sinusoidal variation (e.g. as schematically illustrated in FIG. 3).

FIG. 5(b) shows an example trapezoidal combined fringe pattern 28d and FIG. 5(c) shows associated harmonic content of the fringe pattern shown in FIG. 5(b). FIG. 5(c) has a logarithmic scale and shows the fundamental frequency 31 (also referred to as the first harmonic), the third harmonic 33, fifth harmonic 35, seventh harmonic 37 and ninth harmonic 39. These higher harmonics 33, 35, 37, 39 result in errors during interpolation, i.e. the harmonics 33, 35, 37, 39 cause SDE and therefore cause errors in the measured position of the readhead 4 relative to the scale 6. The magnitudes are shown on a logarithmic scale and have been normalised with the fundamental frequency/first harmonic set to a value of 1.

It has been realised that by varying the radiant power of the EMR source along its extent (the extent substantially parallel to the elongate scale direction) it is possible to tune the shadow-cast fringe pattern 28d which is detected by incremental photodetector 22 and by doing reduce SDE which thereby increases the accuracy of the measured position of the readhead 4 relative to the scale 6.

Varying the radiant power of the EMR source along its extent can be achieved by configuring the shape of the EMR source such that there is more emitting area in the centre of the EMR source and less at the edges as is described in more detail below. However, it will be understood that the invention is not limited to varying the radiant power of the EMR source along its extent by shaping the EMR source and other ways of varying the radiant power of the EMR source along its extent are possible, such as applying a mask over a larger source (or otherwise locating the mask between the EMR source and scale) which could be an opaque mask having a clear window or may be a mask having a graded neutral density filter, the density of which varies according to the desired distribution. It would also be possible to vary the radiant power of the EMR source along its extent which is substantially parallel to the elongate scale direction by controlling the distribution of the current density within the source. Other methods of varying the radiant power of the EMR source along its extent which is substantially parallel to the elongate scale direction are possible as would be apparent to the skilled person.

FIG. 6(a) shows one possible radiant power profile (which illustrates how the radiant power of the EMR source varies along its extent) for reducing the harmonic content in a fringe pattern (compared to an equivalent system in which a light source having a uniform/square-shaped radiant power profile is used). The shape of one possible embodiment of an EMR source having a radiant power profile shown in FIG. 6(a) is shown in FIG. 6(b). An EMR source having the shape shown in FIG. 6(b) would, in use, be aligned so that the x-axis runs substantially parallel with the elongate scale direction and the y-axis as shown in FIG. 6(b) would run substantially orthogonal to the elongate scale direction. The radiant power profile of FIG. 6(a) can be described as being configured such that the radiant power of the light source is greatest toward the centre of the EMR source and lesser at the edges (where the edges are the extremes of the graph along the x-axis of FIG. 6(a) and the centre is located between the edges). If the EMR source emits uniformly over its surface, the desired radiant power distribution can be achieved by physically shaping the light source such that its transverse extent is proportional to I(x). The shape of the radiant power profile of FIG. 6(a) (and hence the width of the shape of the EMR source which emits uniformly over its surface shown in FIG. 6(b)) can be described by equation (2).

$$I(x) = k\cos\left(\frac{\pi x}{f}\right), \frac{-f}{2} \le x \le \frac{f}{2} \quad (2)$$

where
I(x) is the radiant power of the source in a direction substantially transverse to an elongate scale direction (i.e. the radiant power emitted by the EMR source at a given point along its extent which is, in use, substantially parallel to the elongate scale direction);
f is the pitch of the scale;
x is the position in a direction substantially parallel to the elongate scale direction;
k is a scaling constant.

If there is any non-uniformity in the emission of the EMR source over its surface, e.g. due to opaque electrodes on the surface of the source, non-uniform electrical current injection or for any other reason, then the physical shape of the EMR source may be modified to provide a radiant power profile substantially identical to that of FIG. 6(a).

FIG. 6(c) shows the radiant power profile of a shadow-cast fringe pattern 28 formed by the current embodiment as it falls on the detector 22.

FIG. 6(d) shows the harmonic content of the fringe pattern shown in FIG. 6(c) produced when using a light source having a radiant power profile as shown in FIG. 6(a). The fundamental frequency/first harmonic 31 has been normalised to a value of 1. As can be seen in FIG. 6(d) the higher harmonics 33, 35, 37, 39 are eliminated when compared to the harmonics shown in FIG. 5(c). The EMR rays from the EMR source which reach the detector 22 after interaction with the scale 6 have a diversity of angles and radiant power such that a substantially pure sinusoidal fringe pattern is formed at the photodetector 22 which has a fringe period p' substantially matching the period p of the photodetector's 22 detection elements. This results in a lower SDE and therefore an improved encoder. The total harmonic distortion of the fringe pattern shown in FIG. 6(c) can be calculated (using the information in FIG. 6(d)) as the ratio of the root mean square of the amplitudes of the higher harmonics to the root mean square amplitude of the fundaments/first harmonic 31. The total harmonic distortion may be calculated using all harmonics of the first harmonic/fundamental frequency 31 up to the thirteenth harmonic. In other embodiments more or fewer harmonics of the first harmonic/fundamental frequency 31 may be used to calculate the total harmonic distortion. The total harmonic distortion for the fringe pattern shown in FIG. 6(c) is zero.

Figure 7:
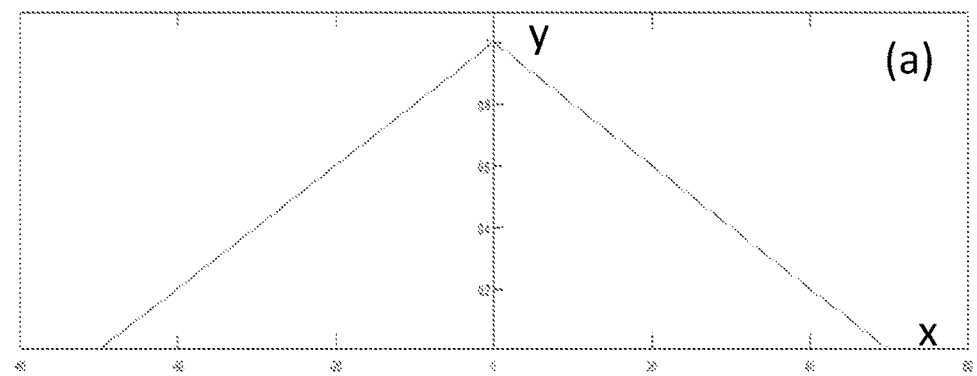
FIG. 7(a) shows a radiant power profile for an EMR source according to another embodiment of the invention.
FIG. 7(b) shows an embodiment of a shaped EMR source which provides a radiant power distribution according to FIG. 7(a)
FIG. 7(c) shows a fringe pattern generated by the EMR source of FIG. 7(b)
FIG. 7(d) shows the harmonic content of the fringe pattern generated by the EMR source of FIG. 7(b)
Figure 7:
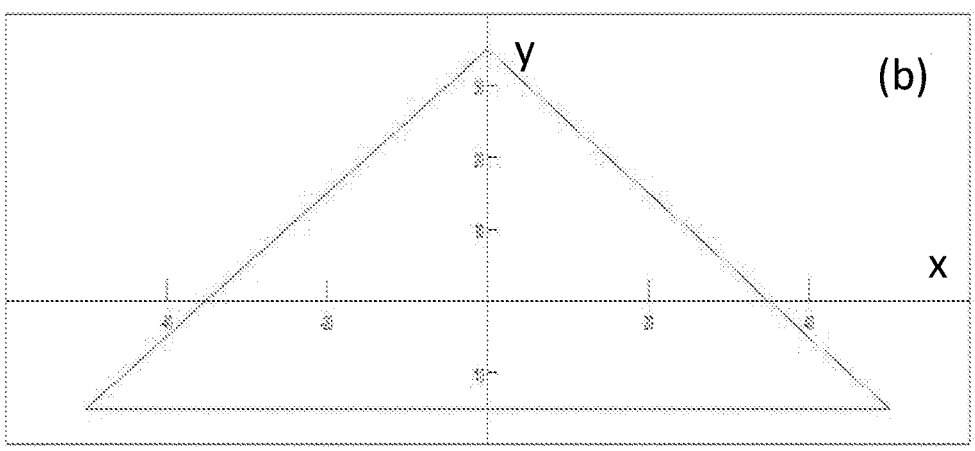
Figure 7:
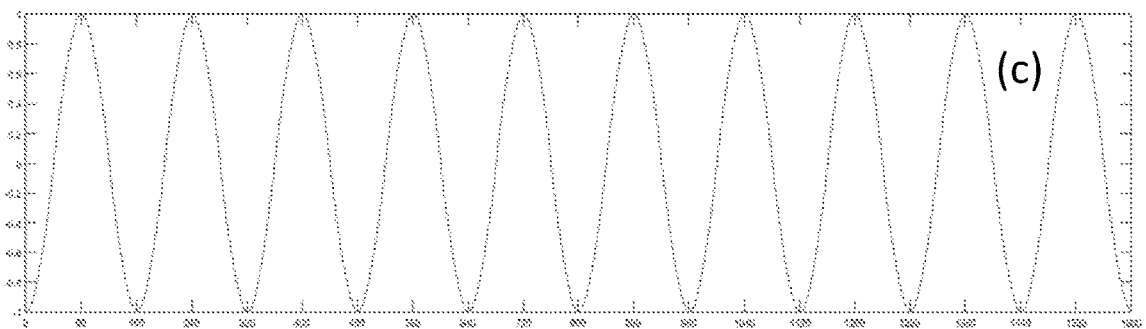
Figure 7:
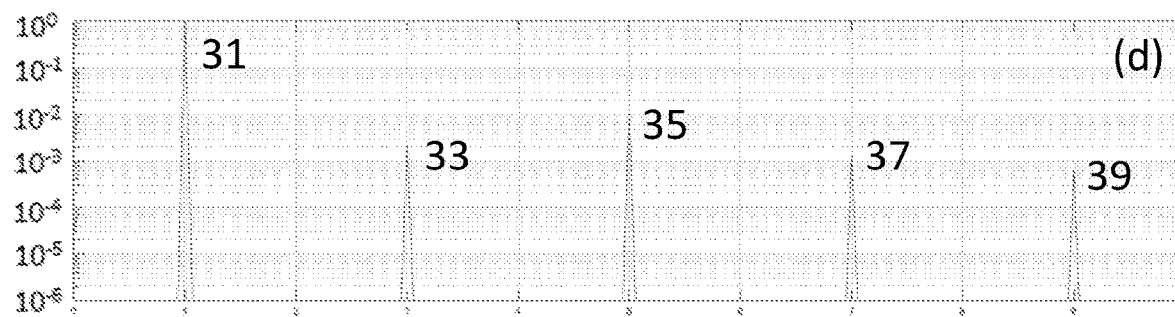

FIG. 7(a) shows a further possible radiant power profile (which illustrates how the radiant power of the EMR source varies along its extent) for reducing the harmonic content in a fringe pattern (compared to an equivalent system in which a light source having a uniform/square-shaped radiant power profile is used). The radiant power profile shown in FIG. 7(a) is triangular. The shape of one possible embodiment of an EMR source having a radiant power profile shown in FIG. 7(a) is shown in FIG. 7(b). In the example shown in FIG. 7(b) the EMR source is a triangle. An EMR source having the shape shown in FIG. 7(b) would, in use, be aligned so that the x-axis runs substantially parallel with the elongate scale direction and the y-axis as shown in FIG. 7(b) would run substantially orthogonal to the elongate scale direction. The radiant power profile of FIG. 7(a) can be described as being configured such that the radiant power of the light source is greatest toward the centre of the EMR source and lesser at the edges (where the edges are the extremes of the graph along the x-axis of FIG. 7(a) and the centre is located between the edges). If the EMR source emits uniformly over its surface, the desired radiant power distribution can be achieved by physically shaping the light source such that its transverse extent is proportional to I(x). The shape of the radiant power profile of FIG. 7(a) (and hence the width of the shape of the EMR source which emits uniformly over its surface shown in FIG. 7(b)) can be described by equation (3).

$$I(x) = k\left(\frac{f}{1.6} - |x|\right), -\frac{f}{1.6} \leq x \leq \frac{f}{1.6} \quad (3)$$

where
I(x) is the radiant power of the source in a direction substantially transverse to an elongate scale direction (i.e. the radiant power emitted by the EMR source at a given point along its extent which is, in use, substantially parallel to the elongate scale direction);
f is the pitch of the scale;
x is the position in a direction substantially parallel to the elongate scale direction;
k is a scaling constant.

Figure 6:
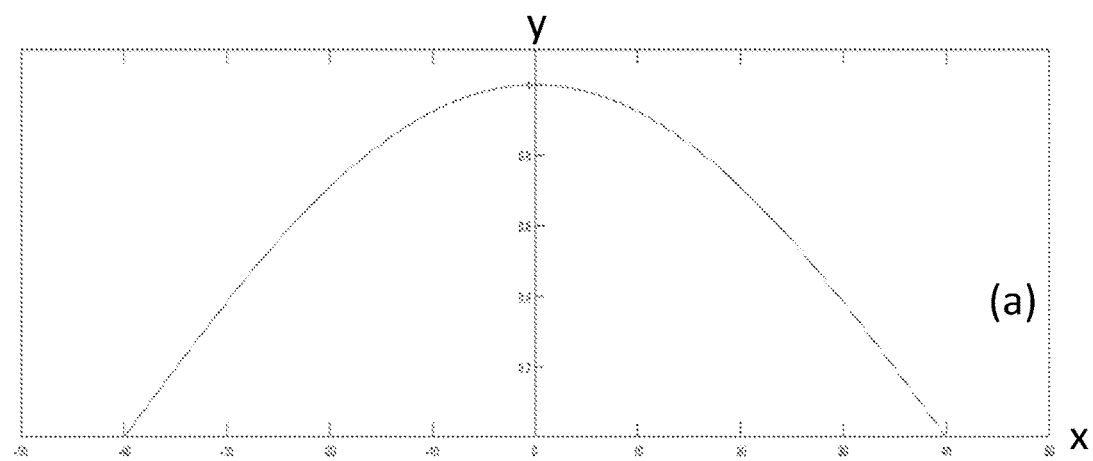
FIG. 6(a) shows a radiant power profile of an EMR source according to one embodiment of the invention.
FIG. 6(b) shows an embodiment of a shaped EMR source which provides a radiant power distribution according to FIG. 6(a)
FIG. 6(c) shows a fringe pattern generated by the EMR source of FIG. 6(b)
FIG. 6(d) shows the harmonic content of the fringe pattern generated by the EMR source of FIG. 6(b)
Figure 6:
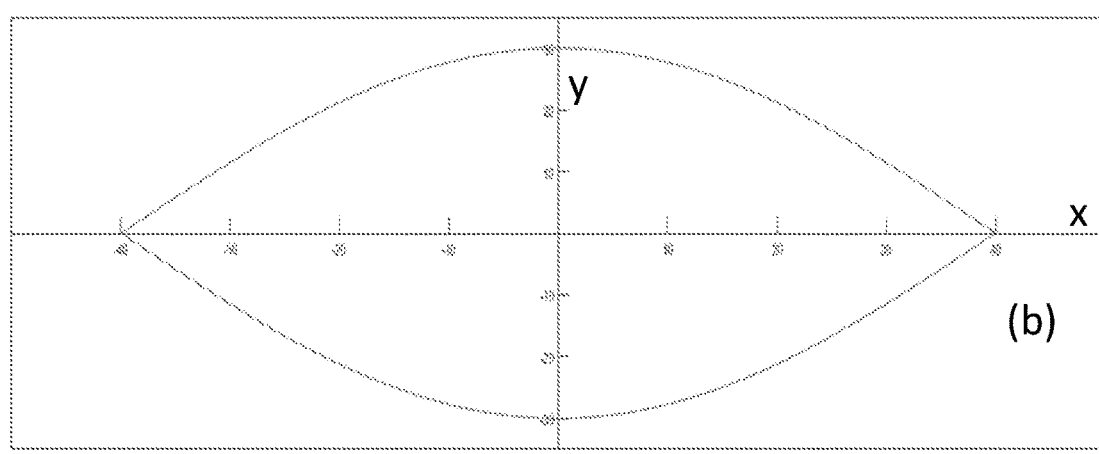
Figure 6:
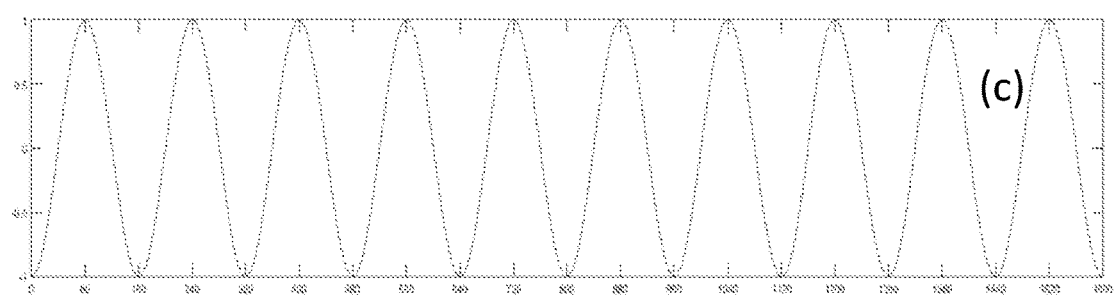
Figure 6:
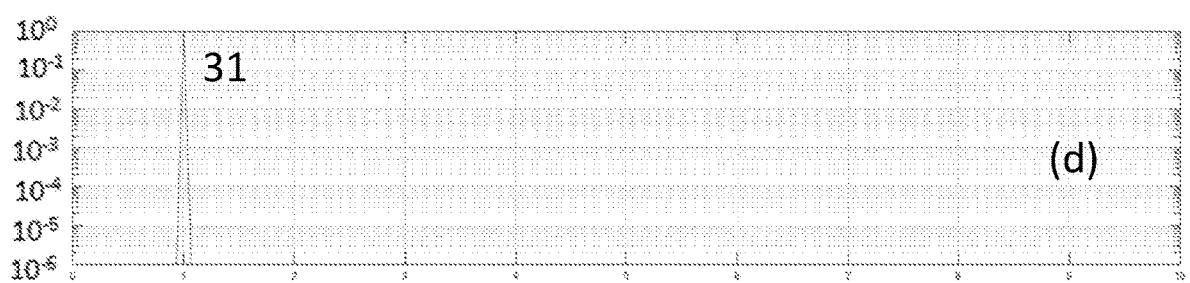

As with the embodiment shown in FIG. 6 if there is any non-uniformity in the emission of the EMR source over its surface, then the physical shape of the EMR source may be modified away from the triangle shape of FIG. 7(b) to provide the triangular radiant power profile of FIG. 7(a).

FIG. 7(c) shows the radiant power of a shadow-cast fringe pattern 28 formed by the current embodiment as it falls on the detector 22.

FIG. 7(d) shows the harmonic content produced when using an EMR source having a radiant power profile as shown in FIG. 7(a), the magnitudes have been normalised (with the fundamental frequency/first harmonic 31 set to a value of 1) and are plotted on a logarithmic scale. As can be seen in FIG. 7(d) the higher harmonics 33, 35, 37, 39 are greatly reduced in comparison to the fundamental 31 when compared to the harmonics shown in FIG. 5(c). The total harmonic distortion for the fringe pattern shown in FIG. 7(c) is 1.8%. This results in a lower SDE and therefore an improved encoder.

Figure 8:
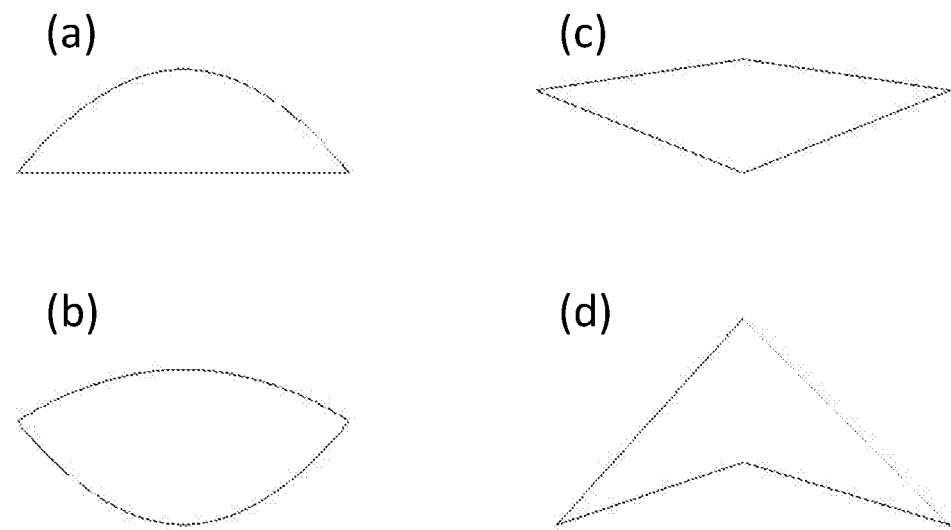
FIG. 8 shows further alternative embodiments of shaped EMR sources.

It will be appreciated that the shape of the EMR sources shown in FIGS. 6(b) and 7(b) are examples only and as will be apparent to the skilled person, other EMR shapes may be used which provide the desired radiant power profiles (such as those shown in FIGS. 6(a) and 7(a)). FIG. 8 shows examples of further alternative EMR source shapes. FIGS. 8(a) and 8(b) show shapes which could provide the radiant power profile shown in FIG. 6(a). It is noted that FIG. 8(a) shows a shape which corresponds to the shape formed by the radiant power profile shown in FIG. 6(a) (as defined in equation (1)) and the x-axis. FIG. 8(b) illustrates that still further shapes are possible to achieve the desired radiant power profile. FIG. 8(c) shows a shape which achieves the desired radiant power profile shown in FIG. 7(a) (as defined in equation (2)). FIG. 8(d) illustrates that still further shapes are possible to achieve the desired radiant power profile. It will be appreciated that the invention is not limited to the shapes disclosed and that the shape of the EMR source may be configured such that the radiant power profile of the EMR source varies in a direction substantially parallel the elongate scale direction so as to substantially reduce or eliminate at least some of the harmonic signals shown in FIG. 5(c) compared to an equivalent system in which a light source having a uniform/square-shaped radiant power profile is used.

In the embodiments in which the varying radiant power profile is achieved by physically shaping the light source, the shaped EMR source may be a light emitting diode ("LED"), for example, and the LED emission distribution may be achieved by etching of an epitaxial semiconductor structure (and/or by applying a shaped mask over the emission surface). However, any shaping method may be used, e.g. the source (e.g. the LED, which may be an Organic-LED "OLED") may be printed to the desired shape.

While the EMR sources described above have been described as single sources this need not be the case and an EMR source such as those shown in FIG. 6, 8 or 10 could be formed from a number of different sources arranged contiguously to form a single compound EMR source.

Figure 9:
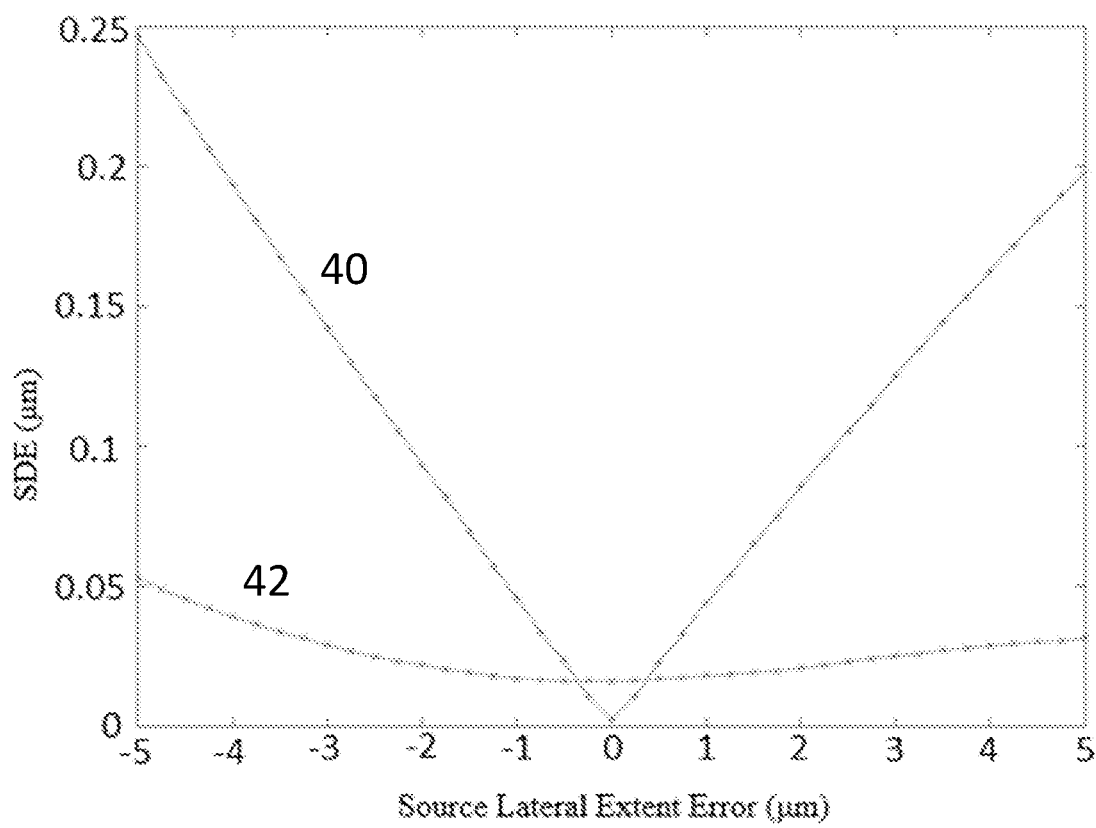
FIG. 9 shows variance in SDE with source lateral extent error for the embodiments shown in FIG. 6 and FIG. 7.

As described above, an EMR source having a radiant power profile shaped as shown in FIG. 6(a) provides at the detector 22 a shadow-cast fringe pattern 28d having the harmonic content shown in FIG. 6(d), i.e. fundamental 31 is present without higher harmonics 33, 35, 37, 39. If there is deviation in the emitted radiant power profile then higher harmonics 33, 35, 37, 39 are not fully eliminated from fringe pattern 28d. FIG. 9 shows how SDE varies with source lateral extent error (as may be present due to manufacturing tolerances etc.) for both an EMR source shaped as in the FIG. 6(b) plot 40, and for an EMR source shaped as in the FIG. 7(b) plot 42 for an 80 μm scale. As can be seen from FIG. 9 (which shows source lateral error against SDE) while a lower minimum SDE can be achieved if the EMR source is shaped as shown in FIG. 6(b), this shape is very sensitive to errors in the lateral extent of the EMR source as shown by plot 40. If the EMR source is shaped as shown in FIG. 7(b), then as shown by plot 42 the variation in SDE is comparatively stable to error in the lateral extent of the EMR source when compared to plot 40.

Other embodiments and ways of implementing the invention will now be described with reference to FIGS. 10 to 14. Referring initially to FIG. 10(a), there is shown a first situation where a point source 26 is located in a first position relative to a scale 6. The point source 26 produces a shadow-cast fringe pattern 28 at the detector (not shown). FIG. 10(b) shows a second situation where, for the same scale and detector arrangement, the point source 26 has been moved a distance F in an elongate scale direction. As can be seen the shadow-cast fringe pattern 28 of FIG. 10(b) is exactly the same as, and is in phase with the shadow-cast fringe pattern of FIG. 10(a), i.e. the two positions are equivalent.

This occurs according to equation (4)

$$F = \frac{f(u+v)}{v} \quad (4)$$

where
f is the scale pitch;
u is the distance from the EMR source to the scale;
v is the distance from the scale to the detectors.

Turning now to FIG. 11, a number of EMR source configurations are shown, here (in (a) and (b)) triangular sources are shown although the principal illustrated is equally applicable to other shaped EMR sources also. FIG. 11(a) shows two possible positions of a shaped source, the two positions are equivalent (i.e. as explained above in connection with FIG. 10). In FIG. 11 a shaded/black area represents a (or part of a) shaped EMR source (non-shaded areas indicating the absence of an EMR source). FIG. 11(a) shows a single triangular source which will produce a shadow-cast fringe pattern at a photodetector 22 when a scale 6 is positioned in a path between the shaped EMR source and the photodetector 22. FIG. 11(b) shows an equivalently placed single triangular EMR source shifted a distance F in relation to the triangular source of FIG. 11(a). The shaped EMR source of FIG. 11(b) will produce a substantially identical shadow-cast fringe pattern at a photodetector 22 as the shaped EMR source of FIG. 11(a).

FIG. 11(c) to FIG. 11(e) show arrangements of EMR sources which will also produce substantially identical shadow-cast fringe pattern at a photodetector 22 as the shaped EMR source of FIG. 11(a) (i.e. are equivalent to a single shaped source as shown in (a) or (b)). In these examples the shadow-cast fringe pattern is produced by two shaped EMR sources arranged to be equivalent to a single triangular EMR source. FIG. 11(f) shows that this is not limited to splitting the shaped EMR source into two parts but the equivalent EMR distribution can be achieved at the photodetector 22 if the single EMR source is split into three or more parts. FIG. 11(g) shows that this is not limited to splitting a single shaped EMR source between two equivalent positions and that the shaped EMR source could be split between three (or more) equivalent positions.

In each of the situations shown in FIG. 11(a) to (g) the total surface area the EMR sources is the same. Further the distribution between equivalent positions is such that, if the EMR sources from equivalent positions were to be placed in a single equivalent position (i.e. if the equivalent positions were superimposed) there would be substantially no overlap of the EMR sources. However, as will be understood, this need not necessarily be the case. FIG. 11(h) shows first and second triangular sources located in equivalent positions, if the radiant power of each source was half of the source shown in FIG. 11(a) (for example) then the same radiant power distribution would be achieved. Each of the first and second sources shown in FIG. 11(h) could be formed of a number of spaced apart sources as described above in relation to FIGS. 11(c) to (g). FIG. 11(i) shows a situation where part of a notionally triangular second source (such as the second source in FIG. 11(h) has been moved a distance F in a direction towards a notionally triangular first source. The sources shown in FIG. 11(i) are in a configuration which produces a radiant power distribution equivalent to that of FIG. 11(h). FIG. 11(j) shows a situation where part of a notionally triangular first source has been moved a distance F in a direction towards a notionally triangular second source, and where part of the notionally triangular second source has been moved a distance F in a direction towards the first notionally triangular source. The sources shown in FIG. 11(j) are in a configuration which produces a radiant power distribution equivalent to that of FIG. 11(h).

A further example of forming a radiant power profile from multiple sources will now be described in relation to FIG. 12. FIG. 12(a) illustrates an embodiment whereby three equivalent positions (as described above in connection with FIG. 10) are shown. As with FIG. 11, a shaded/black area represents the presence of an EMR source (non-shaded areas indicating the absence of an EMR source). For the arrangement shown in FIG. 12(a) if the EMR sources from equivalent positions were to be placed in a single equivalent position (i.e. if the equivalent positions were superimposed) there would be overlap of the EMR sources. It will be appreciated that the arrangement of EMR sources illustrated in FIG. 12(a), provides an arrangement which results in the same fringe pattern at the detector as a single shaped EMR source which provides a radiant power profile as shown in FIG. 12(b).

Many other distributions will be apparent to the skilled person, for example the shaped EMR source could be distributed between equivalent positions spaced nF apart, where n is an integer and may be more than one.

FIG. 13(a) illustrates another way of significantly reducing the SDE of a shadow-cast encoder apparatus. In this embodiment three discrete substantially identical EMR point sources 26a, 26b, 26c are spaced apart by finite separations D' and D". (It will be understood that two, three, four, five or more point sources separated by a finite separation will also produce the illustrated effect). For the sake of clarity FIG. 13(a) shows a transmissive arrangement where light from EMR point sources 26a, 26b, 26c passes through scale 6 rather than being reflected by the scale 6, it will be understood that both reflective and transmissive arrangements are possible.

As can be seen the individual point sources 26a, 26b, 26c can be arranged such that even though each source produces by itself substantially identical square-wave fringe patterns 28a, 28b, 28c at the detector, the spacings D' and D" of the point sources 26a, 26b and 26c are chosen (as explained in more detail below) such that square-wave fringe patterns 28a, 28b, 28c at the detector are slightly phase-shifted with respect to each other such that the detected fringe pattern 28d (being the sum of the individual fringe patterns 28a, 28b, 28c) generated from the spaced apart EMR sources 26a, 26b, 26c shows a move away from a square-wave fringe pattern towards the ideal sinusoidal pattern.

In FIG. 13(a) the source 26b is spaced from source 26a by a distance D' and from the source 26c by a distance D".

The distances D' and D" are defined by equation (5). In the example shown in FIG. 13(a) for the spacing D', $n_i=1$, while for the spacing D", $n_i=2$. It will be appreciated that in other embodiments both D' and D" may have the same value of $n_i$.

$$D = M\left(n_i f + \frac{f}{hs}\right) \text{ or } D = M\left(n_i f - \frac{f}{hs}\right) \quad (5)$$

where
  f is the pitch of the scale;
  h is the order of the harmonic to be cancelled;
  s is the number of sources;
  $n_i$ are integers (which may be the same or different for each separation);
  M is the magnification.
The magnification, M, is given by $$M = \frac{u+v}{v}$$

where
  u is the distance from the source to the scale;
  v is the distance from the scale to the electrograting.
  It is noted that Mf=F as defined in equation (4) above.
  The spacing of sources 26a, 26b, 26c is such that the lateral shift between their fringe patterns 28a, 28b, 28c is equal to a third of the period of the third harmonic 33', this causes the amplitude of the third harmonic 33 of the combined fringe pattern 28d to be reduced to zero.

This effect is not limited to using three separated sources. For example, a similar effect can be achieved by having two separated sources. If the separation D of the two sources is such that the lateral shift between their fringe patterns is equal to half of the period of the third harmonic 33 then the amplitude of the third harmonic 33 of the combined fringe pattern can be reduced to zero as the third harmonic components are in perfect anti-phase.

Similarly, the effect can be targeted at other higher harmonics. For example, having three separated sources spaced so that the fringe patterns they individually form are laterally shifted by one third of the period of the fifth harmonic 35, then cancellation of the fifth harmonic 35 will occur.

FIG. 13(c) shows an example using three triangle sources of the type shown in FIG. 7(b).

FIG. 13(b) shows the harmonic content of a fringe pattern for a single triangle source of the type shown in FIG. 7(b) (and shows identical information to FIG. 7(d) described above).

In FIG. 13(a) and FIG. 13(b) the values in the figures have been normalised with the fundamental frequency/first harmonic 31 having a value defined as 1.

By comparing the amplitude of the higher harmonics in the fringe pattern produced by a single triangle source (FIG. 13(b)) with combined fringe pattern produced by three triangle sources separated so that each produces a fringe pattern phase shifted by one third of the period of the third harmonic 33 (FIG. 13(c)) it can be seen that by combining EMR from three separated triangle EMR sources, it is possible to reduce the magnitude of the third harmonic 33 to zero as well as reduce the magnitude of the fifth harmonic. The total harmonic distortion for the fringe pattern shown in FIG. 13(c) is 0.7%.

As some higher harmonic components 35, 39 remain in the fringe pattern formed on the photodetector 22, optimisation of the lateral extent of the sources needs to take into account the harmonic filtering effect of the electrograting structure. This harmonic filtering by the electrograting structure is a well-known result from sampling theory. Since different electrograting configurations can suppress different harmonics, the optimisation of the source extent needs to account for this.

FIG. 14 compares variance in SDE with source lateral extent error for a single triangle EMR source (plot 42) and three separated triangle EMR sources (plot 44). As can be seen, the effect of manufacturing tolerances on the performance of a single source is significant, with the performance of the three spaced sources 44 almost insensitive to reasonably possible errors in source size (due to manufacturing tolerances etc.).

As will be understood this aspect of the invention is not limited to the use three spaced apart EMR sources and for example, two, three, four, five, ten or more sources may be used. Similarly, it will be understood that this aspect of the invention is not limited to triangle shaped EMR sources and/or to sources shaped as shown in FIG. 6(b) or FIG. 8.

Furthermore, the concept of the embodiments of FIG. 11 or 12 could be combined with the concept of the embodiment of FIG. 13(a). For example, FIG. 15(a) shows two triangular sources 26a, 26b spaced apart a distance D' according to equation (5). In the example shown $n_i=1$, h=3 and s=2. In this example, the third harmonic components would be in perfect anti-phase and the shadow-cast fringe pattern would have no third harmonic component.

In FIG. 15(b) as is the case in FIGS. 11 and 12 a shaded/black area represents a (or part of a) shaped EMR source (non-shaded areas indicating the absence of an EMR source).

FIG. 15(b) shows an example where, like FIG. 15(a) the third harmonic components are in perfect anti-phase and the shadow-cast fringe pattern would have no third harmonic component. In FIG. 15(b) triangular source 26b has been formed from two sub-sources 26b(i) and 26b(ii). The sub-sources 26b(i) and 26b(ii) are spaced apart a distance F as defined by equation (4). As described in relation to FIG. 11, together the two sub-sources 26b(i) and 26b(ii) are equivalent to a single source, and provide one effective source (which is equivalent to the arrangement of FIG. 15(a). As shown in FIG. 15(b) source 26a is spaced apart from a position where, had source 26b been a unitary source (as is the case in FIG. 15(a)) by a distance D' according to equation (5). As the sub-sources 26b(i) and 26b(ii) are equivalent to a single source, the arrangement shown in FIG. 15(b) the third harmonic components of the shadow-case fringe pattern would be in perfect anti-phase and the shadow-cast fringe pattern would have no third harmonic component.

While FIG. 15(b) shows two sources, a unitary source 26a and a source formed by sub sources 26b(i), 26b(ii), it will be appreciated that more than one source could be formed from a number of sub-sources. It will be further appreciated that there is no requirement for the use of a unitary source and that all sources could be formed from a number of sub-sources.

It will be appreciated that one or more single sources may be formed from a number of sub-sources as described in relation to FIG. 12 in order to achieve cancelling of a harmonic (such as the third 33 or fifth 35 harmonic) of the first harmonic/fundamental frequency 31 by spacing apart more than one sources by a distance D as defined by equation (5).

The invention claimed is:

1. A shadow-cast encoder apparatus comprising a scale and a readhead, the readhead comprising at least one electromagnetic radiation source for illuminating the scale in order to produce a shadow-cast fringe pattern at a detector configured to detect the shadow-cast fringe pattern,
the shadow-cast encoder apparatus being configured such that total harmonic distortion of the shadow-cast fringe pattern which falls on the detector is not more than 6%.

2. The shadow-cast encoder apparatus according to claim 1, wherein the total harmonic distortion of the shadow-cast fringe pattern which falls on the detector is not more than 3%.

3. The shadow-cast encoder apparatus according to claim 1, wherein (i) a magnitude of a third harmonic of the shadow-cast fringe pattern which falls on the detector is not more than 3% of a magnitude of a first harmonic of the fringe pattern and/or (ii) a magnitude of a fifth harmonic of the shadow-cast fringe pattern which falls on the detector is not more than 3% of the magnitude of the first harmonic.

4. The shadow-cast encoder apparatus according to claim 1, comprising a plurality of electromagnetic radiation sources for illuminating the scale in order to produce the shadow-cast fringe pattern,
wherein the electromagnetic radiation sources are spaced apart, in an apparatus measuring direction, by a distance D wherein:

$$D \approx M\left(n_i f \pm \frac{f}{hs}\right)$$

where
f is a pitch of the scale;
h is an order of the harmonic to be cancelled;
s is a number of the electromagnetic radiation sources;
$n_i$ is an integer which may be the same or different for each separation if there are more than two of the electromagnetic radiation sources; and
M is magnification.

5. The shadow-cast encoder apparatus according to claim 4, wherein the plurality of electromagnetic radiation sources comprises two electromagnetic radiation sources or three electromagnetic radiation sources.

6. The shadow-cast encoder apparatus according to claim 3, wherein the harmonic of the first harmonic is the third harmonic or the fifth harmonic.

7. The shadow-cast encoder apparatus according to claim 1, wherein the at least one electromagnetic radiation source is configured such that a radiant power of the at least one electromagnetic radiation source along an extent of the at least one source parallel to an apparatus measurement direction is configured to vary such that the total harmonic distortion of the shadow-cast fringe which falls on the detector is achieved.

8. The shadow-cast encoder apparatus according to claim 7, wherein the at least one electromagnetic radiation source is shaped such that the at least one electromagnetic radiation source comprises a width which varies along the extent of the at least one source so as to produce the variation in radiant power.

9. The shadow-cast encoder apparatus according to claim 8, wherein the at least one electromagnetic radiation source produces a radiant power profile which is triangular.

10. The shadow-cast encoder apparatus according to claim 1, wherein a period of the scale is at least 40 µm.

11. The shadow-cast encoder apparatus according to claim 1, wherein the encoder is an incremental encoder.

12. The shadow-cast encoder apparatus according to claim 1, wherein subdivision error (SDE) is less than 0.15 µm.

13. The shadow-cast encoder apparatus according to claim 1, wherein the at least one electromagnetic radiation source is configured such that the total harmonic distortion of the shadow-cast fringe pattern which falls on the detector is not more than 6%.

14. A shadow-cast encoder apparatus comprising a scale and a readhead, the readhead comprising at least one electromagnetic radiation source for illuminating the scale in order to produce a shadow-cast fringe pattern at a detector configured to detect the shadow-cast fringe pattern,
wherein the at least one electromagnetic radiation source is configured such that (i) a magnitude of a third harmonic of the shadow-cast fringe pattern which falls on the detector is not more than 3% of a magnitude of a first harmonic of the shadow-cast fringe pattern and/or (ii) a magnitude of a fifth harmonic of the shadow-cast fringe pattern which falls on the detector is not more than 3% of the magnitude of the first harmonic.

15. A shadow-cast encoder apparatus comprising a scale and a readhead, the readhead comprising at least one group of a plurality of electromagnetic radiation sources for illuminating the scale in order to produce a shadow-cast fringe pattern and a detector for detecting the shadow-cast fringe pattern,
wherein the electromagnetic radiation sources are spaced apart, in an apparatus measuring direction, by a distance D wherein:

$$D \approx M\left(n_i f \pm \frac{f}{hs}\right)$$

where
f is a pitch of the scale;
h is an order of the harmonic to be cancelled;
s is a number of the electromagnetic radiation sources;
$n_i$ is an integer which may be the same or different for each separation if there are more than two of the electromagnetic radiation sources; and
M is magnification.

* * * * *